(12) United States Patent
Digonnet et al.

(10) Patent No.: US 8,520,988 B2
(45) Date of Patent: Aug. 27, 2013

(54) MICRORESONATOR OPTICAL SWITCH HAVING NANOPARTICLES AND METHOD OF OPTICAL SWITCHING

(75) Inventors: Michel J. F. Digonnet, Palo Alto, CA (US); Anuranjita Tewary, Palo Alto, CA (US); Mark Brongersma, Redwood City, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 13/453,588

(22) Filed: Apr. 23, 2012

(65) Prior Publication Data

US 2012/0213471 A1 Aug. 23, 2012

Related U.S. Application Data

(62) Division of application No. 12/699,578, filed on Feb. 3, 2010, now Pat. No. 8,184,932, which is a division of application No. 11/522,802, filed on Sep. 18, 2006, now Pat. No. 7,684,664.

(60) Provisional application No. 60/717,637, filed on Sep. 16, 2005.

(51) Int. Cl.
*G02B 6/26* (2006.01)
*G02B 6/42* (2006.01)

(52) U.S. Cl.
USPC .................. 385/16; 385/5; 385/15; 385/122

(58) Field of Classification Search
None
See application file for complete search history.

(56) References Cited

U.S. PATENT DOCUMENTS

| 6,009,115 A | 12/1999 | Ho |
| 6,101,300 A | 8/2000 | Fan et al. |
| 6,721,093 B2 | 4/2004 | Feillens et al. |

(Continued)

FOREIGN PATENT DOCUMENTS

| JP | 2002-185064 | 6/2002 |
| JP | 2005-507089 | 3/2005 |

(Continued)

OTHER PUBLICATIONS

Tapalian et al., Thermooptical Switches Using Coated Microsphere Resonators, Aug. 2002, IEEE Photonics Technology Letters, vol. 14, No. 8, pp. 1118-1120.*

(Continued)

*Primary Examiner* — Uyen Chau N Le
*Assistant Examiner* — Chad Smith
(74) *Attorney, Agent, or Firm* — Knobbe, Martens, Olson & Bear LLP

(57) ABSTRACT

An optical switch includes a microresonator comprising a plurality of silicon nanoparticles within a silicon-rich silicon oxide layer. The microresonator further includes an optical coupler optically coupled to the microresonator and configured to be optically coupled to a pump source and to a signal source. A method of optical switching includes providing an optical switch comprising an optical coupler and a microresonator having a plurality of nanoparticles and receiving an optical pulse by the optical switch, wherein at least a portion of the optical pulse is absorbed by the nanoparticles such that at least a portion of the microresonator undergoes an elevation of temperature and a corresponding refractive index change when the optical pulse has an optical power greater than a predetermined threshold level.

16 Claims, 15 Drawing Sheets

(56) References Cited

U.S. PATENT DOCUMENTS

| | | | |
|---|---|---|---|
| 6,930,619 B2 | 8/2005 | Shim et al. | |
| 7,242,705 B2 | 7/2007 | Kneissl et al. | |
| 7,444,045 B2 | 10/2008 | Fan et al. | |
| 2001/0012425 A1* | 8/2001 | Irie et al. | 385/33 |
| 2001/0033587 A1 | 10/2001 | Painter et al. | |
| 2003/0021301 A1 | 1/2003 | Vahala et al. | |
| 2003/0152313 A1 | 8/2003 | Tapalian et al. | |
| 2004/0151461 A1 | 8/2004 | Hill | |
| 2005/0058415 A1* | 3/2005 | Lee et al. | 385/122 |
| 2005/0058515 A1 | 3/2005 | Markusch et al. | |
| 2005/0141809 A1 | 6/2005 | Gardner et al. | |
| 2007/0074541 A1 | 4/2007 | Badding et al. | |

FOREIGN PATENT DOCUMENTS

| | | |
|---|---|---|
| JP | 2005-529984 | 10/2005 |
| JP | 2006-513458 | 4/2006 |
| WO | WO 03/001260 A | 3/2003 |
| WO | WO 03/070816 | 8/2003 |
| WO | WO 03/070817 A | 8/2003 |
| WO | WO 2005/017951 | 2/2005 |

OTHER PUBLICATIONS

European Office Action dated Jul. 12, 2012, for European Application No. 06814879.0 in 7 pages.
Armani et al., "*Electrical thermo-optic tuning of ultrahigh-Q microtoroid resonators*", Applied Physics Letters, Nov. 29, 2004, pp. 5439-5441, vol. 85, No. 22, 2004 American Institute of Physics.
Armani et al., "*Ultra-high-Q toroid microcavity on a chip*", Nature Letters, Feb. 27, 2003, pp. 925-928, vol. 421, 2003 Nature Publishing Group.
Betts et al., "*Nonlinear Refractive Index in Erbium Doped Optical Fiber: Theory and Experiment*", IEEE Journal of Quantum Electronics, Apr. 1991, pp. 908-913, vol. 27, No. 4, 1991 IEEE.
Blom, F.C., et al., *Experimental Study of Integrated-Optics Microcavity Resonators: Toward an All-Optical Switching Device*, Applied Physics Letters, Aug. 11, 1997, vol. 71, No. 6, pp. 747-749, American Institute of Physics, Melville, New York.
Carmon et al., "*Dynamical thermal behavior and thermal self-stability of microcavities*", Optics Express, Oct. 4, 2004, pp. 4742-4750, vol. 12, No. 20, 2004 Optical Society of America.
Chiba et al., "*Resonant Frequency Control of a Microspherical Cavity by Temperature Adjustment*", Japanese Journal of Applied Physics, Sep. 9, 2004, pp. 6138-6141, vol. 43, No. 9A, 2004 The Japan Society of Applied Physics.
Davis et al., "*Thermal Effects in Doped Fibers*", Journal of Lightwave Technology, Jun. 1998, pp. 1013-1023, vol. 16, No. 6, 1998 IEEE.
Davis & Digonnet, "*Nanosecond Thermal Fiber Switch using a Sagnac Interferometer*", IEEE Photonics Technology Letters, Oct. 1999, pp. 1256-1258, vol. 11, No. 10, 1999 IEEE.
Elliman, R.G. et al., *The Fabrication and Properties of Silicon-Nanocrystal-Based Devices and Structures Produced by Ion Implantation—The Search for Gain*, May 2003, Nuclear Instruments & Methods in Physics Research, Section—B: Beam Interactions with Materials and Atoms, Elsevier, Amsterdam, NL, pp. 427-431, Canberra, Australia.
European Office Action dated Nov. 19, 2010, for European Application No. 06814879.0.
Friberg et al., "*Femotosecond switching in a dual-core-fiber nonlinear coupler*", Optics Letters, Oct. 1988, pp. 904-906, vol. 13, No. 10, 1988 Optical Society of America.
Gardner, D.S. et al., Microring and microdisk optical resonators prepared using silicon nanocrystals and erbium prepared using silicon technology, *Optical Materials*, Feb. 2005, vol. 27, No. 5, pp. 804-811.
Halas et al., "*Ultrafast light-controlled optical-fiber modulator*", Applied Physics Letters, Apr. 6, 1987, pp. 886-888, vol. 50, No. 14, 1987 American Institute of Physics.

Haraguchi et al., "*Optical switching due to whispering gallery modes in dielectric microspheres coated by a Kerr material*", Journal of Microscopy, Jun. 2003, pp. 229-233, vol. 210, Pt 3, 2003 The Royal Microscopical Society.
Il'Chenko & Gorodetskii, "*Thermal Nonlinear Effects in Optical Whispering Gallery Microresonators*", Laser Physics, 1992, pp. 1004-1009, vol. 2, No. 6, 1992 by Interperiodica.
Kippenberg, T.J. et al., *Purcell Factor Reduced Scattering Losses in Optical Microcavities*, Jun. 12, 2005, Quantum Electronics Conference, 2005. EQEC '05. European Munich, Germany, pp. 358-358, Piscataway, NJ, USA, IEEE.
Lissillour et al., "*Whispering-gallery-mode laser at 1.56 μm excited by a fiber taper*", Optics Letters, Jul. 15, 2001, pp. 1051-1053, vol. 26, No. 14, 2001 Optical Society of America.
Office Action in Japanese Application No. 2008-531416 dated Feb. 22, 2011.
Office Action in Japanese Application No. 2008-531416 dated Dec. 13, 2011.
Orbons, S.M. et al., Effect of material structure on photoluminescence spectra from silicon nanocrystals, *Journal of Applied Physics*, Oct. 15, 2004, vol. 96, No. 8, pp. 4650-4652.
Pantell et al., "*Laser-diode-pumped nonlinear switch in erbium-doped fiber*", Optics Letters, Jul. 15, 1992, pp. 1026-1028, vol. 17, No. 14, 1992 Optical Society of America.
Priolo et al., "*Excitation and non-radiative de-excitation processes in Er-doped Si nanocrystals*", Materials Science and Engineering B, 2001, vol. 81, pp. 9-15, 2001 Elsevier Science S.A.
Rokhsari, H., et al., *Loss Characterization in Microcavities Using the Thermal Bistability Effect*, Applied Physics Letters, Oct. 11, 2004, vol. 85, No. 15, pp. 3029-3031, American Institute of Physics, Melville, New York.
Seo, Se-Young et al., The thermo-optic effect of Si nanocrystals in silicon-rich silicon oxide thin films, Applied Physics Letters, Sep. 27, 2004, vol. 85, No. 13, pp. 2526-2528.
Soref & Bennett, "*Electrooptical Effects in Silicon*", IEEE Journal of Quantum Electronics, Jan. 1987, vol. QE-23, No. 1, pp. 123-129, IEEE.
Spooner, Marc G., et al. *Effect of Microcavity Structures on the Photoluminescence of Silicon Nanocrystals*, Materials Research Society Symposium, 2003, vol. 770, pp. 11.8.1-11.8.6, US.
Sung, Joo-Yeon et al., *Cavity Q Measurements of Silica Microspheres with Nanocluster Silicon Active Layer*, IEEE Journal of Selected Topics in Quantum Electronics, vol. 12, No. 6, Nov./Dec. 2006, pp. 1388-1393.
Sung & Shin of Dept. of Physics, Korea Advanced Institute of Science and Technology (KAIST) and Tewary & Brongersma of Geballe Laboratory for Advanced Materials, Stanford University, Abstract entitled "*Cavity Q measurements of silica microspheres with nanocrystal silicon active layer*", Jul. 12, 2005, pp. 1-7 and figs 1-4.
Tapalian et al., "*Thermooptical Switches Using Coated Microsphere Resonators*", IEEE Photonics Technology Letters, Aug. 2002, vol. 14, No. 8, pp. 1118-1120, 2002 IEEE.
Tewary, Anuranjita et al., *Silicon-Nanocrystal-Coated Silica Microsphere Thermooptical Switch*, IEEE Journal of Selected Topics in Quantum Electronics, vol. 12, No. 6, Nov./Dec. 2006, pp. 147-1479.
Yang, Lan and Vahala, K.J., *Gain Functionalization of Silica Microresonators*, Optics Letters, Apr. 15, 2003, vol. 28, No. 8, pp. 592-594, Optical Society of America, Washington, D.C.
International Search Report dated Jan. 22, 2007 for PCT/US2006/036329, filed on Sep. 18, 2006. Title: Microresonator Optical Switch, Applicant: The Board of Trustees of the Leland Stanford Junior University.
International Preliminary Report on Patentability dated Mar. 27, 2008 for PCT/US2006/036329, filed on Sep. 18, 2006. Title: Microresonator Optical Switch, Applicant: The Board of Trustees of the Leland Stanford Junior University.
Japanese Office Action mailed on Mar. 12, 2013 for Japanese Patent Application No. 2012-052784.

* cited by examiner

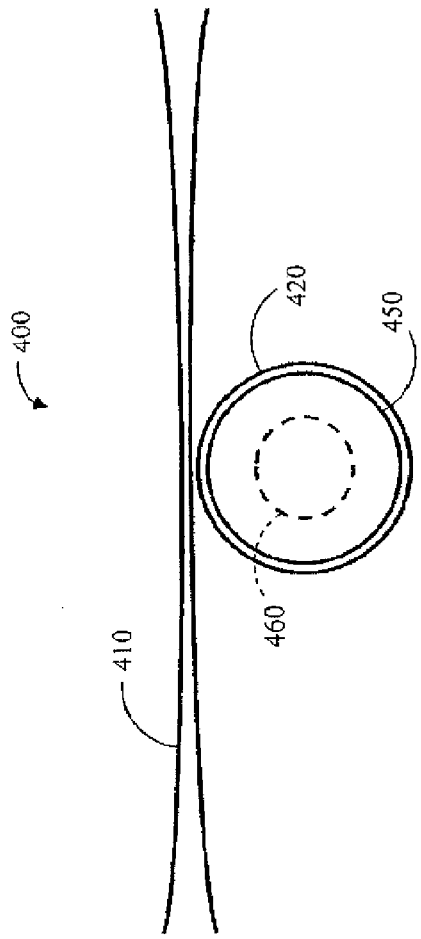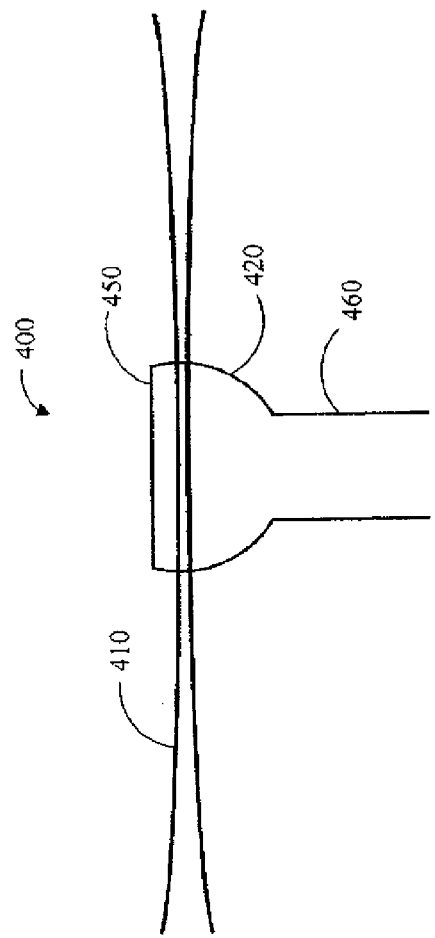
Figure 14A:
Figure 14B:

MICRORESONATOR OPTICAL SWITCH HAVING NANOPARTICLES AND METHOD OF OPTICAL SWITCHING

CLAIM OF PRIORITY

This application is a divisional of U.S. patent application Ser. No. 12/699,578, filed Feb. 3, 2010 and incorporated in its entirety by reference herein, which is a divisional of U.S. patent application Ser. No. 11/522,802, filed Sep. 18, 2006 (now U.S. Pat. No. 7,684,664) and incorporated in its entirety by reference herein, and which claims the benefit of priority to U.S. Provisional Patent Appl. No. 60/717,637, filed Sep. 16, 2005, which is incorporated in its entirety by reference herein.

U.S. GOVERNMENT LICENSE RIGHTS

This invention was made with U.S. Government support under contract 0444731 awarded by the National Science Foundation. The U.S. Government has certain rights in this invention.

BACKGROUND OF THE INVENTION

1. Field of the Invention

The present application relates generally to optical modulators and switches.

2. Description of the Related Art

All-optical fiber modulators and switches are important devices that have been researched for many years mainly because of the desire for low-loss, low-power, fiber-interfaced, optically-addressable switching devices in optical communication and fiber sensor systems. These systems include, but are not limited to, periodic self-healing communication networks, re-configurable optical signal processing, packet switching for local area networks, bit switching, towed sensor arrays, and testing of fiber links.

Unfortunately, very few physical mechanisms are available to modulate the refractive index of a silica fiber in order to induce switching. The widely-studied Kerr effect has an extremely fast response time (e.g., a few femtoseconds) but it is notoriously weak. Kerr-based fiber switches typically utilize power on the order of 20 watts in a 10-meter fiber at 1.55 micrometers for full switching (see, e.g., N. J. Halas, D. Krökel, and D. Grischkowsky, "*Ultrafast light-controlled optical fiber modulator,*" Applied Physics Letters, Vol. 50, No. 14, pages 886-888, April 1987; and S. R. Friberg, A. M. Weiner, Y. Silberberg, B. G. Sfez, and P. S. Smith, "*Femtosecond switching in a dual-core fiber nonlinear coupler,*" Optics Letters, Vol. 13, No. 10, pages 904-906, October 1988) or a switching power-length product PL of approximately 200 watt-meters. Resonantly-enhanced nonlinearities in fibers doped with a rare earth such as $Er^{3+}$ are considerably stronger (PL approximately equal to $10^{-2}$ watt-meter) but are very slow (e.g., response time of approximately 10 milliseconds; see, e.g., R. A. Betts, T. Tjugiarto, Y. L. Xue, and P. L. Chu, "*Nonlinear refractive index in erbium doped optical fiber: theory and experiment,*" IEEE Journal of Quantum Electronics, Vol. 27, No. 4, pages 908-913, April 1991; and R. H. Pantell, R. W. Sadowski, M. J. F. Digonnet, and H. J. Shaw, "*Laser-diode-pumped nonlinear switch in erbium-doped fiber,*" Optics Letters, Vol. 17, No. 4, pages 1026-1028, July 1992). Switching has also been induced thermally in fibers doped with an absorber. For example, a 2.55-centimeter $Co^{2+}$-doped fiber switch required a switching peak power of 1.8 kilowatts (PL approximately equal to 5 watt-meters), and its response time was approximately 25 nanoseconds (see, e.g., M. K. Davis, and M. J. F. Digonnet, "*Nanosecond thermal fiber switch using a Sagnac interferometer,*" IEEE Photonics Technology Letters, Vol. 11, No. 10, pages 1256-1258, October 1999).

More recently, Tapalian et al. (H. C. Tapalian, J.-P. Laine, and P. A. Lane, "*Thermooptical switches using coated microsphere resonators,*" IEEE Photonics Technology Letters, Vol. 14, pages 1118-1120, August 2002) have demonstrated switching in a microsphere resonator coated with an absorbing polymer by shining a 405-nanometer pump beam on the microsphere's surface. The pump heated the polymer and the microsphere, which thermally shifted the micro sphere's resonance wavelengths and switched a 1.55-micrometer signal. The use of a resonator greatly reduces the switching power: a pump exposure of only 4.9 milliwatts for approximately 0.5 second was sufficient to shift the resonance by approximately 1,000 linewidths. Since full switching requires a shift of about one linewidth, the switching power was only 4.9 microwatts, and the switching energy of approximately 2.5 microjoules. However, the switch response time was very long (e.g., 0.165 second). Taking the characteristic dimension of such a switch to be the sphere diameter (250 micrometers in this case), this device has a PL product of approximately $1.2 \times 10^{-9}$ watt-meter, which is very low. Whispering gallery mode microsphere resonators based on the Kerr effect have also been previously studied (see, e.g., M. Haraguchi, M. Fukui, Y. Tamaki, and T. Okamoto, "*Optical switching due to whispering gallery modes in dielectric microspheres coated by a Kerr material,*" Journal of Microscopy, Vol. 210, Part 3, pages 229-233, June 2003; A. Chiba, H. Fujiwara, J. Hotta, S. Takeuchi, and K. Sasaki, "*Resonant frequency control of a microspherical cavity by temperature adjustment,*" Japanese Journal of Applied Physics, Vol. 43, No. 9A, pages 6138-6141, 2004). Compared to other all-optical fiber switches, microsphere-based optical switches offer the unique advantages of extremely small size (e.g., a microsphere is typically only 50-500 micrometers in diameter) and very low switching energy. The reason is that the resonator has such sharp resonances that a very small change in the microsphere index is sufficient to induce full switching.

SUMMARY OF THE INVENTION

In certain embodiments, an optical switch comprises a microresonator comprising a plurality of nanoparticles. The microresonator is configured to receive signal light having a signal wavelength and to receive a pump pulse having a pump wavelength. At least a portion of the microresonator is responsive to the pump pulse by undergoing a refractive index change at the signal wavelength.

In certain embodiments, an optical switch comprises a microresonator comprising a plurality of nanoparticles. The optical switch further comprises an optical coupler optically coupled to the microresonator. The optical coupler has a first portion configured to receive signals from a signal source, a second portion optically coupled to the first portion and configured to be optically coupled to the microresonator, and a third portion optically coupled to the second portion and configured to transmit signals received from the second portion. The optical switch transmits signals having a signal power greater than a predetermined threshold power from the first portion to the third portion and does not transmit signals having a signal power less than the predetermined threshold power from the first portion to the third portion.

In certain embodiments, a method fabricates an optical switch comprising a microsphere coated with silicon nanocrystals. The method comprises providing a silica optical fiber. The method further comprises melting at least a portion of the fiber to form at least one silica microsphere. The method further comprises coating the microsphere with a silica layer. The method further comprises precipitating silicon nanocrystals within the silica layer by annealing the microsphere. The method further comprises passivating the nanocrystals by annealing the microsphere in a hydrogen-containing atmosphere.

In certain embodiments, a method of optical switching comprises providing an optical switch comprising an optical coupler and a microresonator optically coupled to the optical coupler and having a plurality of nanoparticles. The method further comprises receiving an optical pulse by the optical switch. At least a portion of the optical pulse is absorbed by the nanoparticles of the microresonator such that at least a portion of the microresonator undergoes an elevation of temperature and a corresponding refractive index change when the optical pulse has an optical power greater than a predetermined threshold level.

In certain embodiments, a method of optical switching comprises providing an optical switch comprising an optical coupler and a microresonator optically coupled to the optical coupler and having a plurality of nanoparticles. The method further comprises receiving an optical pulse by the optical switch. At least a portion of the optical pulse is absorbed by the nanoparticles of the microresonator such that at least a portion of the optical switch undergoes an increase of the number of free carriers therein and a corresponding refractive index change when the optical pulse has an optical power greater than a predetermined threshold level.

BRIEF DESCRIPTION OF THE DRAWINGS

FIGS. 14A and 14B schematically illustrate a side view and a top view, respectively, of another example optical switch comprising a microresonator compatible with certain embodiments described herein.

DETAILED DESCRIPTION

Figure 1:
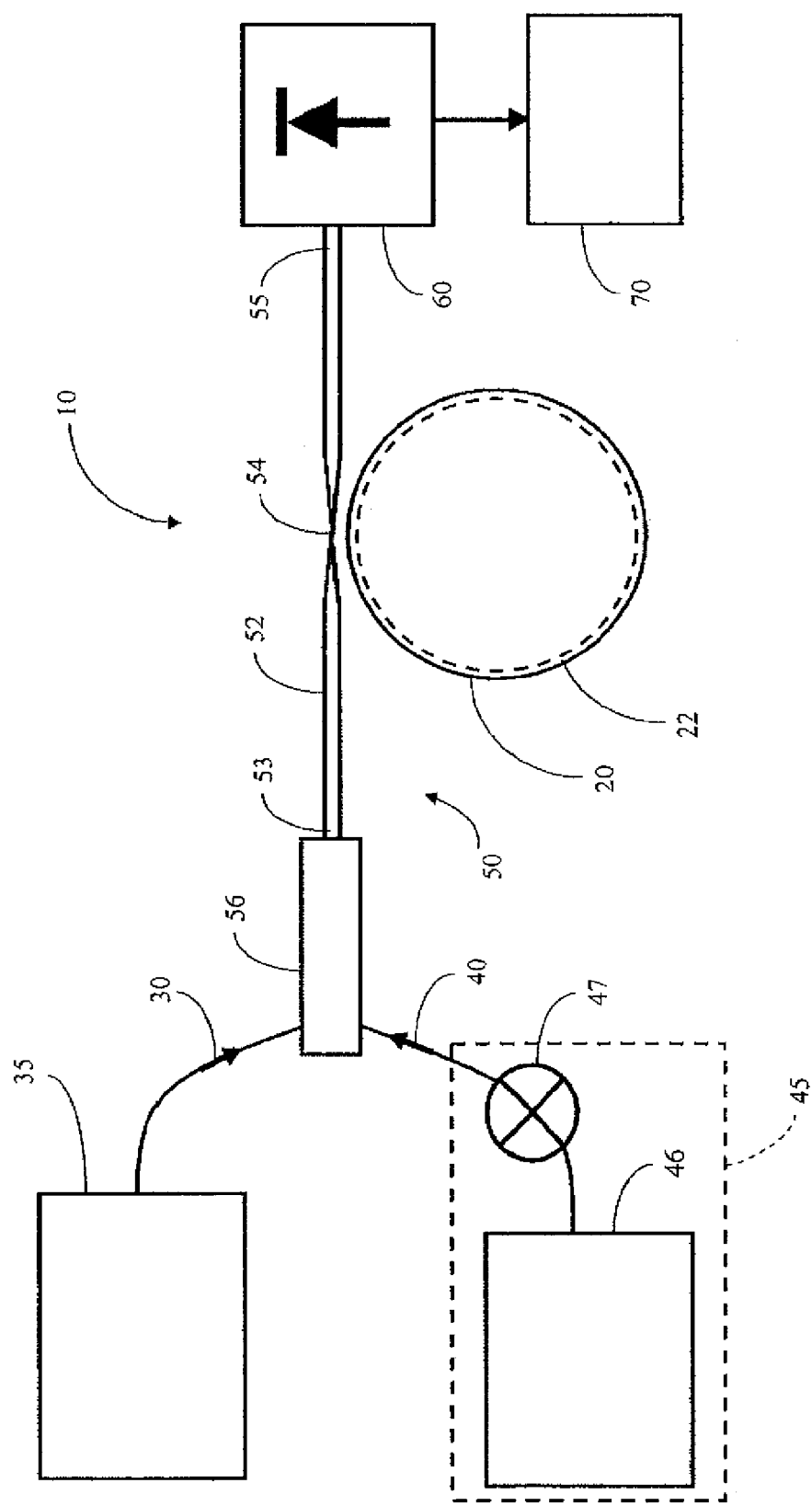
FIG. 1 schematically illustrates an example optical switch compatible with certain embodiments described herein comprising a tapered fiber with the pump pulse and the signal inputted to one end of the tapered fiber.

FIG. 1 schematically illustrates an optical switch 10 in accordance with certain embodiments described herein. The optical switch 10 comprises a microresonator 20 comprising a plurality of nanoparticles. The microresonator 20 is configured to receive signal light 30 having a signal wavelength and to receive a pump pulse 40 having a pump wavelength. At least a portion of the microresonator 20 is responsive to the pump pulse 40 by undergoing a refractive index change at the signal wavelength.

As schematically illustrated by FIG. 1, in certain embodiments, the optical switch 10 further comprises an optical coupler 50 optically coupled to the microresonator 20 and configured to be optically coupled to a signal source 35 and to a pump source 45. The optical coupler 50 transmits the pump pulse 40 from the pump source 45 to the microresonator 20 and transmits the signal light 30 from the signal source 35 to the microresonator 20.

In certain embodiments, the microresonator 20 comprises a microcavity, a microsphere, a microring, a microdisc, a microtoroid, a waveguide resonator on a chip, or a high-Q microresonator (e.g., planar microresonator on a silicon chip). In certain embodiments, the microresonator 20 comprises silica ($SiO_2$) glass, doped silica-based glass (e.g., doped with germanium), borosilicate glass, ZBLAN glass, organic materials (e.g., polymethyl-methacrylate (PMMA)), or patterned oxynitride films on a silicon chip. The microresonator 20 can be fabricated using various techniques and various standard semiconductor microfabrication tools (see, e.g., D. K. Armani, T. J. Kippenberg, S. M. Spillane, and K. J. Vahala, "*Ultra-high-Q toxoid microcavity on a chip,*" *Nature*, 27 Feb. 2003, Vol. 421, pages 925-928; F. Lissillour, D. Messager, G. Stéphan, and P. Féron, "*Whispering-gallery mode laser at 1.56 μm excited by a fiber laser,*" Optics Letters, 15 Jul. 2001, Vol. 26, No. 14, pages 1051-1053). Microring and microdisc resonators can also be fabricated using various deposition techniques, including but not limited to, chemical-vapor deposition (CVD) techniques employing $SiH_4$ and $N_2O$, Such on-chip resonators can also be coated with a nanoparticle layer using CVD or other deposition techniques.

In certain embodiments, the microresonator 20 comprises a layer 22 comprising the plurality of nanoparticles. The layer 22 can be at least a portion of the outermost layer of the microresonator 20 or at least a portion of an inner layer of the microresonator 20 below an outer surface of the microresonator 20. As used herein, the term "layer" is used in its broadest ordinary meaning. For example, a layer may comprise a single material having a generally uniform thickness or may comprise multiple sublayers each comprising a different material. In certain embodiments, the layer 22 comprises a first material (e.g., the plurality of nanoparticles) distributed either uniformly or non-uniformly within a second material. In certain embodiments, the layer 22 comprises two or more types of nanoparticles distributed either uniformly or non-uniformly within a second material. The layer 22 may extend completely or substantially completely around the microresonator 20, or it may extend only partly around the microresonator 20. The layer 22 may be generally continuous or may comprise two or more expanses or regions that are non-contiguous with one another.

In certain embodiments, the nanoparticles are crystalline, while in certain other embodiments, the nanoparticles are amorphous. In certain embodiments, the nanoparticles comprise a semiconductor material including but not limited to silicon, germanium, II-VI compound semiconductors (e.g., CdTe, CdS, or CdSe), III-V compound semiconductors (e.g., GaAs), or a metallic material with strong resonant absorption in a specific wavelength range due to surface plasmon resonance (e.g., noble metals, Au, Ag, Cu, Al). Various types of microresonators 20 discussed above can be easily coated with a layer of one or more of these types of nanoparticles. The nanoparticles of certain embodiments have a strong absorption at the pump wavelength and a negligible absorption at the signal wavelength, as is described more fully below.

In certain embodiments described herein, a novel low-energy all-optical fiber switch 10 comprises a silica microsphere resonator 20 coated with an silica layer 22 containing silicon nanocrystals. In certain embodiments, the switch 10 comprises a high-Q silica microsphere coated with a thin layer of silicon-rich silicon oxide (SRSO) in which nanocrystals of silicon (Si) are precipitated, as described more fully below.

In certain embodiments, the signal source 35 comprises a tunable laser which generates signal light 30 having a signal wavelength (e.g., 1450 nanometers) in the infrared portion of the electromagnetic spectrum. In certain embodiments, the signal source 35 is a narrow-band tunable source, while in certain other embodiments, the signal source 35 is a wide-band tunable source. The signal wavelength of certain embodiments is selected (i) to coincide with a whispering gallery mode or resonance of the microresonator 20, and (ii) to be outside the absorption band of the nanoparticles so the signal is not significantly absorbed by the nanoparticles. For example, in certain embodiments in which the microresonator 20 comprises a silica microsphere coated with a silica layer 22 containing silicon nanoparticles, a signal wavelength of 1450 nanometers is used since it is generally outside the absorption band of silicon. The signal wavelength of certain embodiments is in a range between 500 nanometers and 2000 nanometers, in a range between 1300 nanometers and 1600 nanometers, or in a range between 1300 nanometers and 1500 nanometers, while other signal wavelengths are also compatible with various embodiments described herein.

In certain embodiments, the pump source 45 comprises a laser 46 (e.g., Argon-ion laser) which generates light having a pump wavelength (e.g., 488 nanometers) in the visible or infrared portions of the electromagnetic spectrum. In certain embodiments, the laser 46 is a narrow-band tunable source, while in certain other embodiments, the laser 46 is a wide-band tunable source. The pump source 45 of certain embodiments comprises a modulator 47 (e.g., mechanical chopper wheel, acoustic-optic modulator, or electro-optic modulator) which modulates the light from the laser 46 into short pulses of adjustable width at a low frequency (e.g., 10 Hz). Other types of modulators can be used to modulate the pump into pulses of adequate width, such as direct modulation in the case of a semiconductor pump laser. In certain embodiments, the pump wavelength is shorter than the signal wavelength. In certain embodiments, the pump pulse 40 has a plurality of pump wavelengths and the one or more pump wavelengths are selected to fall within the absorption band of the nanoparticles (e.g., silicon nanocrystals within a silicon-rich silicon oxide coating) such that the pump pulse 40 is significantly absorbed by the nanoparticles. Therefore, the pump pulse resonates poorly, if at all. The pump wavelength of certain embodiments is in a range between 300 nanometers and 1500 nanometers, while other pump wavelengths (e.g., 820 nanometers, 980 nanometers, 1060 nanometers, and 1480 nanometers) are also compatible with various embodiments described herein.

The optical coupler 50 transmits at least one pump pulse 40 from the pump source 45 to the microresonator 20 and transmits the signal light 30 from the signal source 35 to the microresonator 20. As schematically illustrated in FIG. 1, the optical coupler 50 comprises an optical fiber 52 (e.g., a single-mode fiber). In certain other embodiments, the optical coupler 50 comprises an optical waveguide formed on a substrate (e.g., a semiconductor substrate such as a silicon wafer). In certain embodiments, the optical coupler 50 comprises one or more first portions 53 configured to be optically coupled to the pump source 45 and to the signal source 35, and a second portion 54 optically coupled to the microresonator 20. The optical coupler 50 further comprises an output portion 55 configured to be optically coupled to an optical system (e.g., comprising an optical detector 60 and an oscilloscope 70). In certain embodiments, the first portion 53 and the third portion 55 of the optical coupler 50 are the same as one another.

In certain embodiments, the optical coupler 50 comprises a multiplexer 56 (e.g., a wavelength-division multiplexer (WDM) fiber coupler), as schematically illustrated in FIG. 1, which multiplexes the signal 30 and the pump pulse 40 into an input first portion 53 of a bi-tapered single-mode optical fiber 52 having a bi-tapered second portion 54 optically coupled to the microresonator 20 and having an output portion 55 optically coupled to an optical system (e.g., detector 60 and oscilloscope 70). The bi-tapered second portion 54 of the optical fiber 52 in certain embodiments has a neck diameter of a few micrometers.

Figure 2:
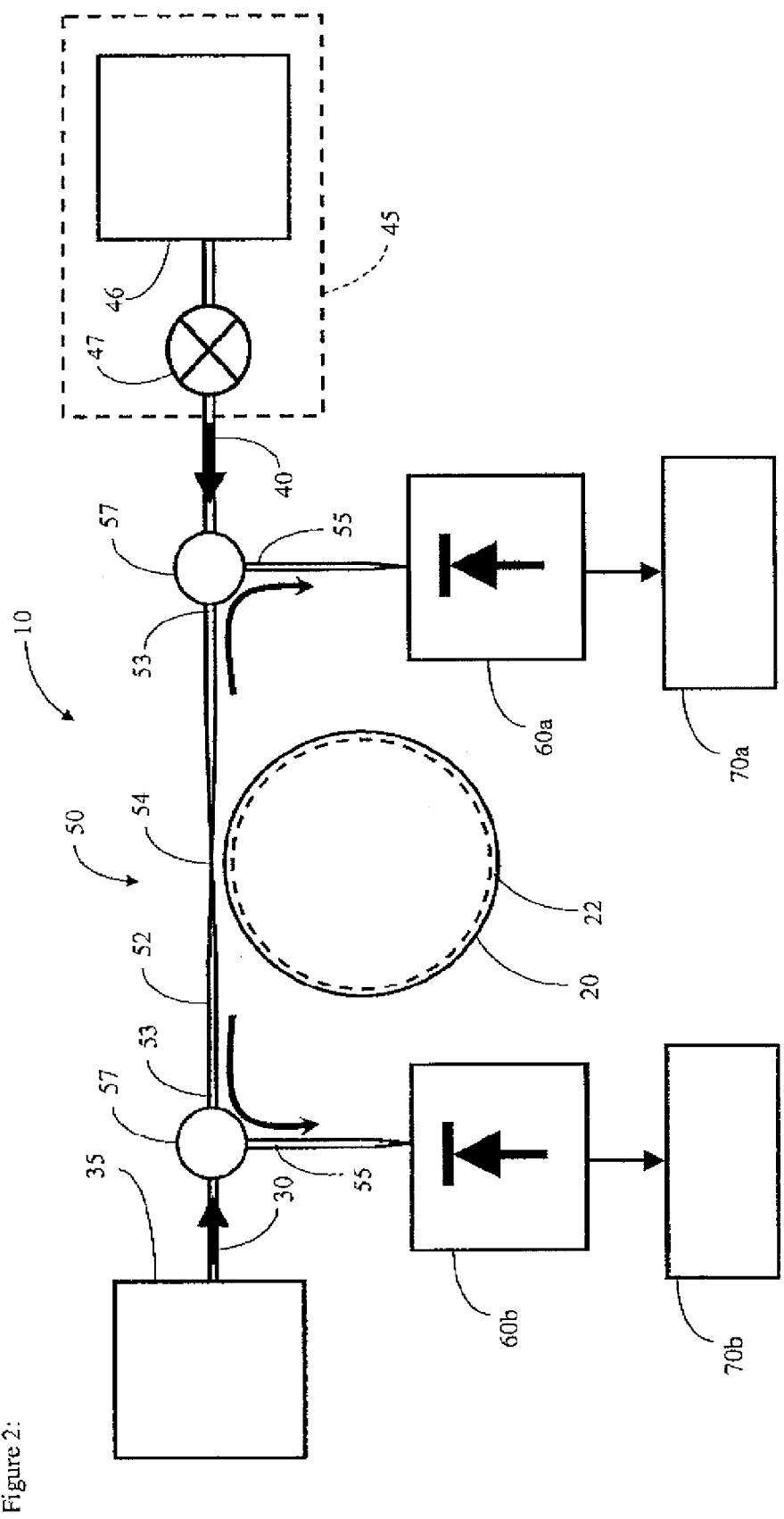
FIG. 2 schematically illustrates another example optical switch compatible with certain embodiments described herein comprising a tapered fiber with the pump pulse and signal inputted to opposite ends of the tapered fiber.

In certain other embodiments, the optical coupler 50 comprises two multiplexers 56 (e.g., fiber, micro-, or bulk-optic) or two fiber circulators 57, as schematically illustrated in FIG. 2. In certain such embodiments, the pump pulse 40 and the signal 30 are coupled to different first portions 53 (e.g., different ends of the optical fiber 52) via a multiplexer 56 or a circulator 57 at each first portion 53, as schematically illustrated by FIG. 2, while in certain other such embodiments, the pump pulse 40 and the signal 30 are coupled to the same first portion 53 (e.g., same end of the optical fiber 52) via the multiplexer 56, as schematically illustrated by FIG. 1. In certain embodiments, the optical coupler 50 advantageously minimizes signal losses by transmitting substantially all of the signal power to the tapered second portion 54. In certain embodiments, the optical coupler 50 advantageously minimizes pump power losses by transmitting substantially all of the pump power to the tapered second portion 54. In certain embodiments, the signal 30 is outputted to an optical system (e.g., comprising detector 60a and oscilloscope 70a) and the pump pulse 40 is monitored by the optical system (e.g., comprising an optical detector 60b and an oscilloscope 70b).

Figure 3:
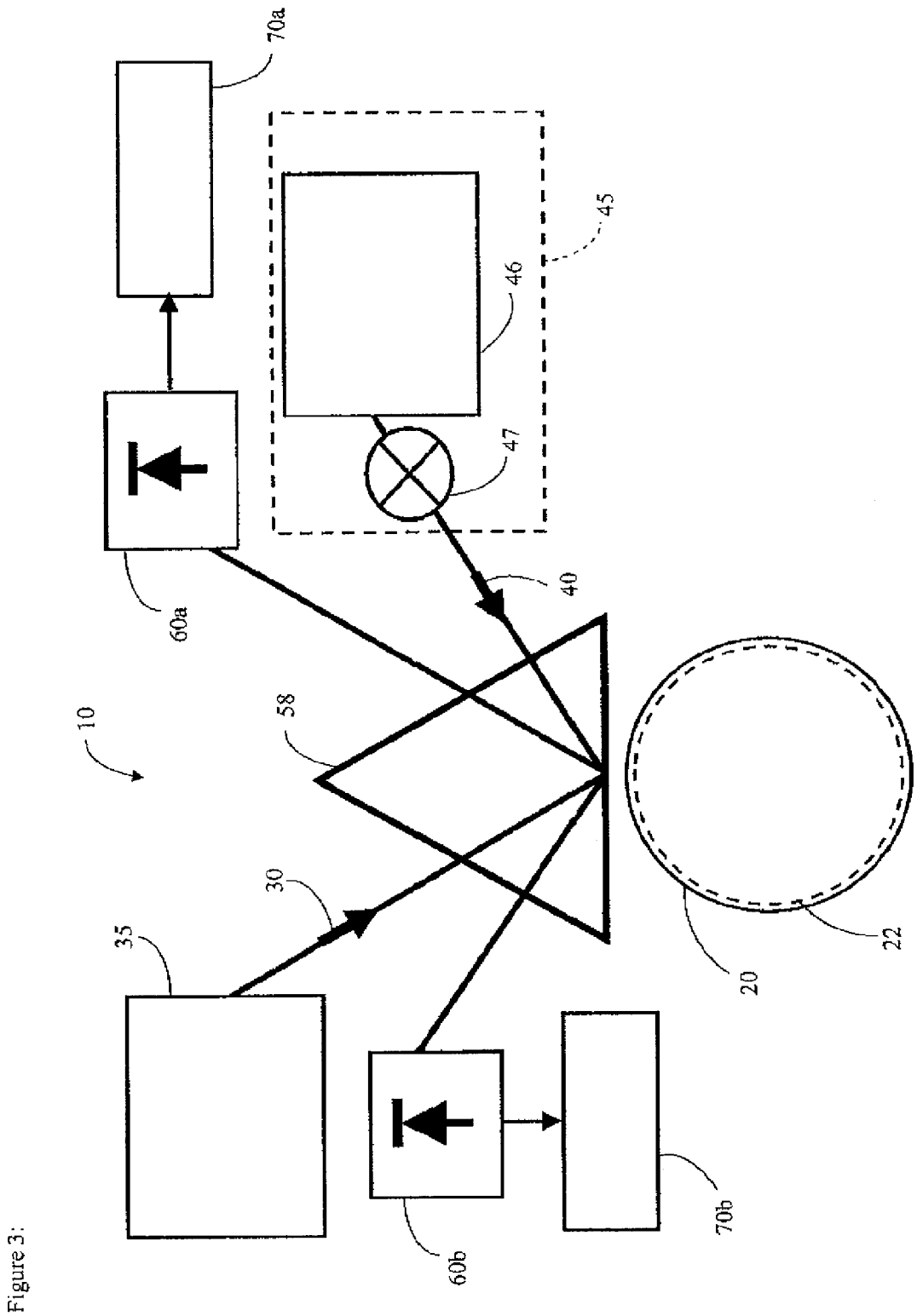
FIG. 3 schematically illustrates another example optical switch compatible with certain embodiments described herein comprising a prism which couples the pump pulse and the signal to the microresonator.

In certain embodiments, the optical coupler 50 comprises a prism 58, as schematically illustrated in FIG. 3. The prism 58 couples the pump pulse 40 and the signal 30 to the microresonator 20 at different angles in certain embodiments in which the pump pulse 40 and the signal 30 have different wavelengths. In certain embodiments, the pump pulse 40 and the signal 30 are launched from opposite sides of the prism 58, as schematically illustrated in FIG. 3. Alternatively, the pump pulse 40 and the signal 30 are launched from the same side of the prism 58 in certain other embodiments. In certain embodiments, the signal 30 is outputted to an optical system (e.g., comprising detector 60a and oscilloscope 70a) and the pump pulse 40 is monitored by the optical system (e.g., comprising an optical detector 60b and an oscilloscope 70b).

In certain embodiments, at least a portion of the microresonator 20 undergoes an increase in temperature and a corresponding change in refractive index in response to the pump pulse 40. In certain embodiments, when a pump pulse 40 is launched into the microresonator 20, the pump pulse 40 is absorbed by the nanoparticles, which heats the microresonator 20 and changes its refractive index, and thus switches the signal 30 by shifting its resonance. For example, in certain embodiments in which the microresonator 20 comprises a microsphere with a silica layer containing silicon nanocrystals, the silica layer responds to the pump pulse 40 by increasing in temperature such that the microresonator 20 undergoes a corresponding refractive index change at the signal wavelength. In certain embodiments, the microresonator 20 is transmissive to the signal 30 when the microresonator 20 is at the elevated temperature due to absorption of the pump pulse 40 and is not transmissive to the signal 30 when the microresonator 20 is at a lower temperature. In certain other embodiments, the microresonator 20 is not transmissive to the signal 30 when the microresonator 20 is at the elevated temperature due to absorption of the pump pulse 40 and is transmissive to the signal 30 when the microresonator 20 is at a lower temperature.

Figure 4:
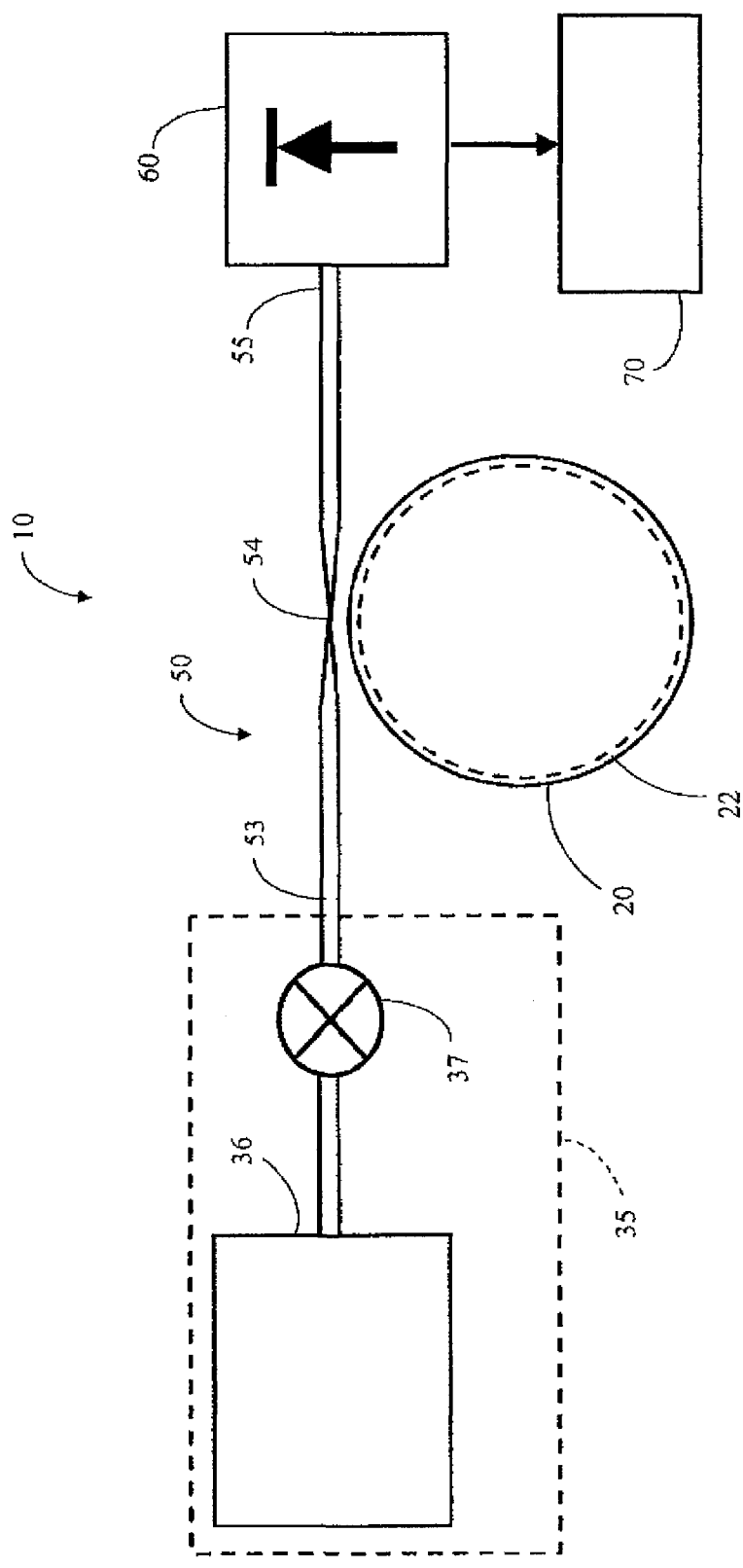
FIG. 4 schematically illustrates another example optical switch for self-switching in accordance with certain embodiments described herein.

FIG. 4 schematically illustrates another example optical switch 10 in accordance with certain embodiments described herein. The optical switch 10 comprises a microresonator 20 comprising a plurality of nanoparticles. In certain embodiments, the nanoparticles are in a layer 22 of the microresonator 20. The optical switch 10 further comprises an optical coupler 50 optically coupled to the microresonator 20. The optical coupler 50 has a first portion 53 configured to receive signals 30 from a signal source 35, a second portion 54 optically coupled to the first portion 53 and configured to be optically coupled to the microresonator 20, and a third portion 55 optically coupled to the second portion 54 and configured to transmit signals 30 received from the second portion 54 to an optical system (e.g., comprising an optical detector 60 and an oscilloscope 70). The optical switch 10 transmits signals 30 having a signal power greater than a predetermined threshold power from the first portion 53 to the third portion 55. The optical switch 10 does not transmit signals 30 having a signal power less than the predetermined threshold power from the first portion 53 to the third portion 55.

In certain such embodiments, the optical switch 10 can be used as a "self-switch" which utilizes self-switching in the microresonator 20 in which the signal 30 switches itself and in which neither a multiplexer nor a pump pulse is used. The signal 30 has a signal wavelength in certain such embodiments that coincides with one of the resonance wavelengths of the microresonator 20 (e.g., a whispering gallery mode). When the signal 30 has a low signal power and is launched into the microresonator 20, the amount of signal power absorbed by the microresonator 20 is sufficiently small that the temperature of the microresonator 20 is essentially unchanged by the signal 30. Therefore, the low-power signal resonates within the microresonator 20 and essentially no power is transmitted to the third portion 55 of the optical coupler 50.

When the signal power is increased, the amount of signal power absorbed by the microresonator 20 increases, and the signal power is dissipated in the form of heat in the mode volume, thereby increasing the temperature of the microresonator 20 and altering the resonance condition by shifting the resonance wavelength of the microresonator 20. When the signal power is greater than a predetermined threshold power, the resonance wavelength of the microresonator 20 is shifted sufficiently so that the high-power signal 30 does not resonate with the microresonator 20 and a significant portion of the signal power is transmitted to the third portion 55 of the optical coupler 50. Thus, the high-power signal 30 has switched itself.

In certain embodiments, the optical switch 10 exhibits bi-stable behavior. For example, for a continuous-wave (cw) signal 30 sent into the input portion 53 of an optical coupler 50 coupled to a microresonator 20, increasing the signal power correspondingly heats up the microresonator 20, so that the signal 30 no longer resonates. Once the resonance wavelength has been shifted enough by the heat generated by the signal power, the signal 30 no longer resonates with the microresonator 20, so the signal 30 is transmitted to the output portion 55 of the optical coupler 50, and the microresonator 20 cools down. The microresonator 20 then cools down until the resonant condition with the signal 30 is reached and the signal 30 resonates again with the microresonator 20, and the signal 30 is not transmitted to the output portion 55 of the optical coupler 50, at which time the microresonator 20 heats up again, etc. In certain embodiments, this bi-stable behavior is advantageously avoided by using signal pulses which are shorter than the thermal response time of the microresonator 20. For example, in certain embodiments, the signal source 35 comprises a laser 36 and a modulator 37 that determines the period of the signal pulses. In certain such embodiments, a signal pulse is received by the optical switch 10, heats up the microresonator 20, but is over by the time the heat has had time to flow out of the heated volume of the microresonator 20, so the signal pulse does not experience the subsequent cooling of the microresonator 20. Similarly, the next signal pulse advantageously is not received by the optical switch 10 too soon after the previous signal pulse, since it is advantageous that the microresonator 20 be at ambient temperature (e.g., not heated by the previous signal pulse) when the next signal pulse arrives. In certain embodiments, the dynamics of this oscillatory system advantageously permits fast switching processes (e.g., under the microsecond time scale).

Thus, in certain embodiments, whether the signal 30 is transmitted to the third portion 55 of the optical coupler 50 or not is controlled by the signal power level (e.g., for a low signal power, the signal output is zero; for a high signal power, the signal output is maximum.) Such a self-switching embodiment can be used to sort out "zeros" and "ones" in a stream of data. In certain other embodiments, such a self-switch can be used to regenerate signals. For example, for a signal pulse train of zeros (low power pulses) and ones (high power pulses) being transmitted through an optical transmission line, noise in the transmission line's amplifiers can cause the zeros to no longer be true zeros, but to carry a little power. Sending this signal pulse train through a self-switching optical switch 10 can restore these small-power zeros to true zeros, since the zeros carry too little power to switch themselves, so they resonate around the microresonator, where they lose all of their power and thus are converted to true zeros.

Figure 5:
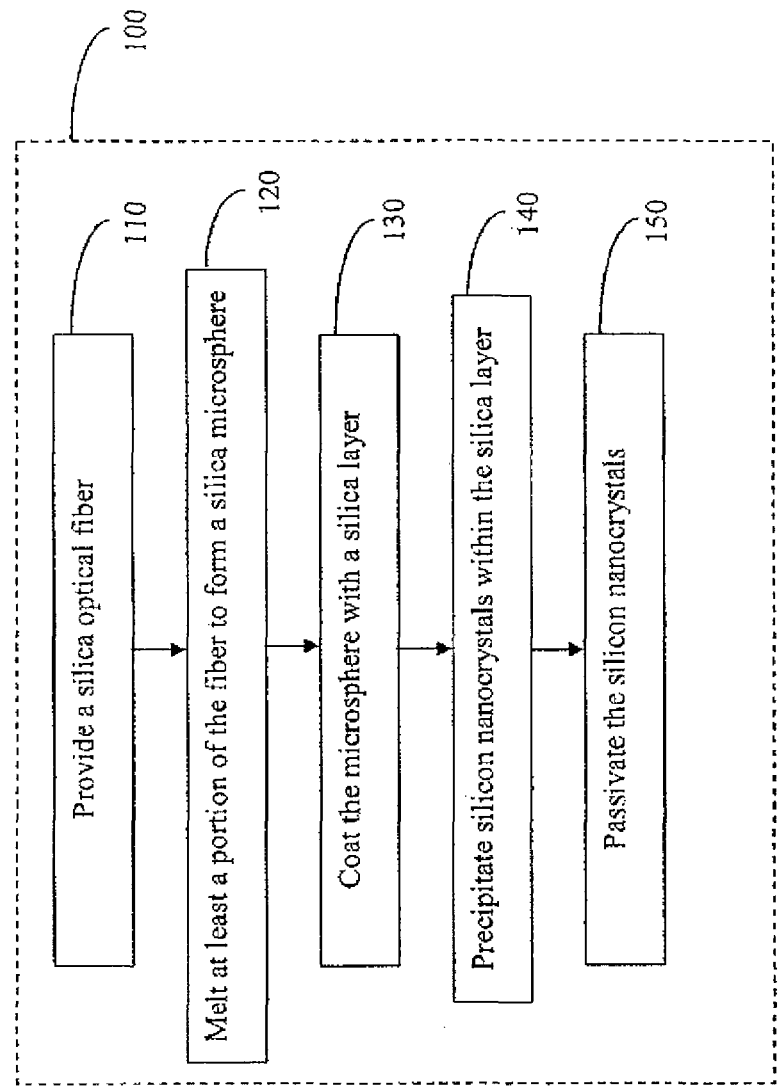
FIG. 5 is a flow diagram of an example method that fabricates an optical switch comprising a microsphere coated with silicon nanocrystals in accordance with certain embodiments described herein.

FIG. 5 is a flow diagram of an example method 100 that fabricates an optical switch 10 comprising a microsphere coated with silicon nanocrystals in accordance with certain embodiments described herein. The method 100 comprises providing a silica optical fiber (e.g., Corning SMF-28E optical fiber) in an operational block 110. The method 100 further comprises melting at least a portion (e.g., one end) of the fiber to form at least one silica microsphere in an operational block 120. In certain embodiments, microspheres with diameters of approximately 150 micrometers are fabricated by melting the tip of the single-mode silica fiber using approximately 3 watts of power from a 125-watt 10.6-micrometer $CO_2$ laser and taking advantage of surface tension to form spherical droplets with an atomically smooth surface (see, e.g., J.-Y. Sung, J. H. Shin, A. Tewary, and M. L. Brongersma, "*Cavity Q measurements of silica microspheres with nanocrystal silicon active layer,*" in preparation). The typical Q factor of such microspheres around 1450 nanometers was measured to be approximately $5 \times 10^7$.

The method 100 further comprises coating the microsphere with a silica layer (e.g., 140 nanometers thick) in an operational block 130. In certain embodiments, the microspheres are coated with a layer of silicon-rich silicon oxide (e.g., $SiO_x$ with x<2) (SRSO) using inductively-coupled plasma-enhanced chemical vapor deposition of $SiH_4$ and $O_2$ with Ar plasma while rotating the microspheres to facilitate even coating.

The method 100 further comprises precipitating silicon nanocrystals within the silica layer by annealing the microsphere in an operational block 140. The method 100 further comprises passivating the nanocrystals by annealing the microsphere in a hydrogen-containing atmosphere in an operational block 150. In certain embodiments, the microspheres are annealed first at 1100° C. for 60 minutes to precipitate the silicon nanocrystals, and then at 650° C. while in a forming gas for 60 minutes to hydrogen-passivate the dangling bonds in the nanocrystals. The presence of nanocrystals was confirmed in selected samples with transmission electron microscopy (TEM). Reference samples were coated with silica instead of SRSO and underwent similar post-annealing treatments. As expected, no nanocrystals were detected in these reference samples. Because the signal (at approximately 1450 nanometers) falls out of the absorption band of Si nanocrystals, in certain embodiments, it is negligibly absorbed by the coating and the coated microspheres still have a high Q at the signal wavelength (e.g., approximately $3 \times 10^5$ at 1450 nanometers).

In certain embodiments, the method 100 further comprises providing an optical coupler 50 comprising an optical fiber 52 having a tapered portion 54 and optically coupling the tapered portion 54 to the microsphere. In certain embodiments, the method 100 further comprises optically coupling a multiplexer 56 to the tapered optical fiber 52, the multiplexer 56 having a first portion configured to be optically coupled to a pump source 45, a second portion configured to be optically coupled to a signal source 35, and a third portion optically coupled to the tapered optical fiber 52. The multiplexer 56 is configured so that one or more pump pulses 40 transmitted into the first portion of the multiplexer from the pump source 45 are transmitted to the tapered optical fiber 52. The multiplexer 56 is further configured so that one or more signals 30 from the signal source 35 are transmitted into the second portion of the multiplexer 56 to the tapered optical fiber 52.

Figure 6:
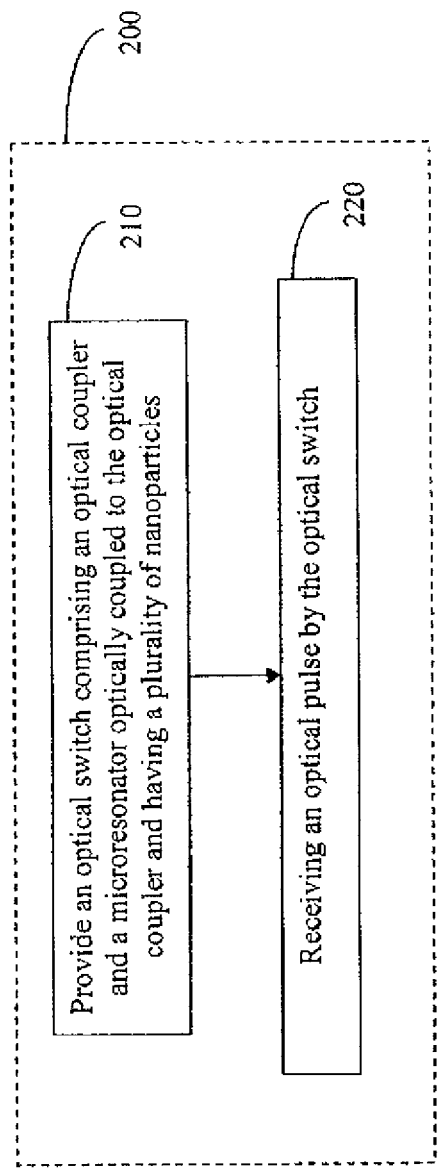
FIG. 6 is a flow diagram of an example method for optical switching in accordance with certain embodiments described herein.

FIG. 6 is a flow diagram of an example method 200 of optical switching in accordance with certain embodiments described herein. The method 200 comprises providing an optical switch comprising an optical coupler and a microresonator optically coupled to the optical coupler and having a plurality of nanoparticles, in an operational block 210. The method 200 further comprises receiving an optical pulse by the optical switch in an operational block 220. At least a portion of the optical pulse is absorbed by the nanoparticles of the microresonator such that at least a portion of the microresonator undergoes an elevation of temperature and a corresponding refractive index change when the optical pulse has an optical power greater than a predetermined threshold level.

In certain embodiments, the optical pulse is transmitted through the optical switch when the optical power of the optical pulse is greater than the predetermined threshold level, and the optical pulse is not transmitted through the optical switch when the optical power of the optical pulse is less than the predetermined threshold level. In certain other embodiments, the optical pulse is not transmitted through the optical switch when the optical power of the optical pulse is greater than the predetermined threshold level, and the optical pulse is transmitted through the optical switch when the optical power of the optical pulse is less than the predetermined threshold level.

In certain embodiments, the method 200 further comprises receiving an optical signal by the optical switch. In certain such embodiments, the optical signal is transmitted through the optical switch when the optical power of the optical pulse is greater than the predetermined threshold level, and the optical signal is not transmitted through the optical switch when the optical power of the optical pulse is less than the predetermined threshold level. In certain other such embodiments, the optical signal is not transmitted through the optical switch when the optical power of the optical pulse is greater than the predetermined threshold level, and the optical signal is transmitted through the optical switch when the optical power of the optical pulse is less than the predetermined threshold level.

In certain embodiments, the optical coupler comprises an optical fiber having a first portion, a second portion, and a tapered portion between the first portion and the second portion and optically coupled to the microresonator, and a multiplexer optically coupled to the optical fiber. The method 200 further comprises sending the optical pulse through the multiplexer to the tapered portion of the optical fiber. In certain embodiments, at least a portion of the optical pulse is absorbed by the microresonator such that the microresonator temperature is elevated. When an optical signal propagates through the tapered portion while the temperature of the microresonator is elevated, the optical signal propagates from the first portion to the second portion of the optical fiber. When the optical signal propagates through the tapered portion while the temperature of the microresonator is not elevated, the optical signal resonates with the microresonator and does not propagate to the second portion of the optical fiber. In certain embodiments, the optical pulse and the optical signal are the same, such that the optical pulse is self-switched. In certain embodiments, the microresonator comprises a silica microsphere coated with a silica layer containing silicon nanocrystals.

Performance of Microsphere-Based Embodiments

In certain embodiments described herein, a novel low-energy all-optical fiber switch 10 comprises a high-Q silica microsphere resonator 20 coated with a thin layer of silicon-rich silicon oxide (SRSO) in which nanocrystals of silicon (Si) are precipitated. Certain such embodiments advantageously use Si nanocrystals as an absorber instead of a polymer, as used by Tapalian et al., since (1) Si nanocrystals are compatible with standard micro-fabrication technologies, and (2) Si nanocrystals have a broad absorption band that extends into the near infrared (IR), so that this switch 10 can advantageously be pumped with a standard laser diode (e.g., at 808 nanometers). In certain embodiments, the optical switch 10 uses a standard multiplexing scheme to couple the pump and the signal into the microsphere through the same bi-tapered fiber. Certain such embodiments advantageously yield a more efficient utilization of the pump energy.

In certain embodiments, when a pump pulse is launched into the microsphere, it is absorbed by the nanocrystal layer, which heats the microsphere and changes its refractive index, and thus switches the signal by shifting its resonance. A resonance wavelength shift of 5 picometers, sufficient to fully switch the signal, was observed with a pump pulse power of 3.4 microwatts and a pump pulse width of 25 milliseconds, or a pump pulse energy of only 85 nanojoules. This result is in good agreement with the prediction of a simple thermal model, described below. The rise time of the switch was measured to be approximately 25 milliseconds (a value imposed by the pump peak power) and its fall time to be approximately 30 milliseconds (a value imposed by the microsphere's thermal time constant). This value is approximately 5 times faster than previously reported (see, e.g., Tapalian et al.) and in agreement with predictions (see, e.g., V. S. Il'chenko and M. L. Gorodetskii, *"Thermal nonlinear effects in optical whispering gallery microresonators,"* Laser Physics, Vol. 2, pages 1004-1009, 1992). The product of the switching peak power of 3.4 microwatts and the device's characteristic dimension (diameter of 150 micrometers) is $5.1 \times 10^{-10}$ watt-meter, which is one of the lowest values reported for an all-optical switch.

In the absence of the pump pulse, the signal is on resonance with the microsphere, and the power of the signal is depleted, mostly by scattering, as the signal resonates around the microsphere. Thus, the signal does not come out of the tapered fiber's output portion when the microsphere is not excited by the pump pulse.

Upon being launched into the tapered optical fiber, the energy of the pump pulse is absorbed by the nanocrystals, which are thus excited above their bandgap. As the nanocrystals relax to the ground state, heat is generated and transferred to at least a portion of the microsphere (e.g., the mode volume), which elevates the temperature of the heated portion of the microsphere. This elevated temperature changes the microsphere's refractive index and the dimensions of the microsphere. The absorption of the pump pulse by the microsphere causes its resonance wavelengths to shift. When the wavelength shift is large enough, the wavelength of the signal pulse no longer falls on the resonance to which it was originally matched, and all the signal power comes out of the output portion of the tapered optical fiber. Thus, the signal has been switched.

After the pump pulse has passed through, the microsphere cools down to its initial temperature (e.g., through natural or forced convection into the surrounding medium, typically air, although other fluids can be advantageously used). The microsphere resonance wavelengths thus return to their initial values, the signal pulses become resonant again with the microsphere, and no signal power comes out of the output portion of the tapered optical fiber.

In certain embodiments, the nanocrystals increase the pump absorption rate as compared to the pump scattering loss rate. Scattering in general does not contribute to heating the microsphere, so by increasing the pump absorption rate as compared to the pump scattering loss rate, the presence of nanocrystals increases the fraction of the pump energy which is turned into heat. Thus, the nanocrystals advantageously reduce the pump energy required for switching. However, in certain embodiments in which the silica microsphere does not comprise silicon nanocrystals, the pump pulse is absorbed by the microsphere's silica material (which has a lower ratio of absorption loss to scattering loss than do the nanocrystal-doped silica), and a higher switching power of the pump pulse is required.

The switching energy of certain embodiments can be evaluated with a simple thermal model. When the microsphere is heated, its refractive index changes through the index thermal coefficient $\partial n/\partial T$ of silica, and its diameter changes through thermal expansion of silica. Since the effect of thermal expansion is about two orders of magnitude weaker than that of the index change, the thermal expansion can conveniently be neglected. The switching energy can therefore be obtained by calculating the index change which shifts the signal resonance by one linewidth (which is sufficient to fully switch the signal), then calculating the heat it takes to change the microsphere index by this amount. The change with temperature in the resonance wavelengths of a microsphere around 1450 nanometers, calculated from the microsphere's resonant condition and the $\partial n/\partial T$ of silica (approximately $10^{-5}$° $C.^{-1}$) is approximately 10 picometers/° C. For small temperature increases (e.g., $\delta T < 1°$ C.), by analogy with an optical fiber (see, e.g., M. K. Davis, M. J. F. Digonnet, and R. H. Pantell, *"Thermal effects in doped fibers,"* Journal of Lightwave Technologies, Vol. 16, No. 6, pages 1013-1023, June 1998), the temperature of the microsphere at steady state (e.g., after the pump has been on longer than the microsphere's relaxation time) is close to uniform.

Energy conservation states that the heat that is to be injected into the sphere per unit time to maintain its steady-state temperature at a temperature $\delta T$ above the temperature of the surrounding air is given by:

$$\dot{H} = hA\delta T \quad (1)$$

where h is the heat transfer coefficient of silica in air due to natural convection, and A is the microsphere area. If $P_{abs}$ is the pump power absorbed by the microsphere, steady-state switching is achieved in certain embodiments when $P_{abs} = \dot{H}$. In the example cited above (85 nanojoules of switching energy), the microsphere has a diameter of 150 micrometers and a Q approximately equal to $3 \times 10^5$. The resonance linewidth around 1450 nanometers, and thus the wavelength shift for full switching, is approximately 4.8 picometers, or a temperature change $\delta T \approx 4.8/10 = 0.5°$ C. Assuming the h coefficient of the silica microsphere to be the same as for a silica cylinder (h=81 W/m²/° C.), Equation 1 is used to show that the absorbed pump power for switching is approximately 2.9 microwatts.

The degree of switching can be monitored experimentally in certain embodiments by continuously scanning the signal wavelength over the resonance to record the resonance dip on a digitizing oscilloscope. This measurement can then be repeated with the pump laser on to record the shift in resonance at steady state.

In certain embodiments in which the taper is fairly lossy at the pump wavelength, the taper loss at the pump wavelength is measured to determine the pump power coupled into the microsphere. One method to measure the taper loss is to measure the pump power coupled into and exiting the tapered fiber when the microsphere is coupled to the tapered fiber, then to repeat this measurement when the microsphere is decoupled from the tapered fiber. This measurement is then repeated after reversing the ports of the tapered fiber (i.e., when coupling the pump at the output port). This set of measurements yields unambiguously the transmission loss of the two tapered fiber sections (input to neck and neck to output) and the pump power absorbed in the microsphere. A similar measurement can be used for other microresonators (e.g., toroidal microresonators).

Figure 7:
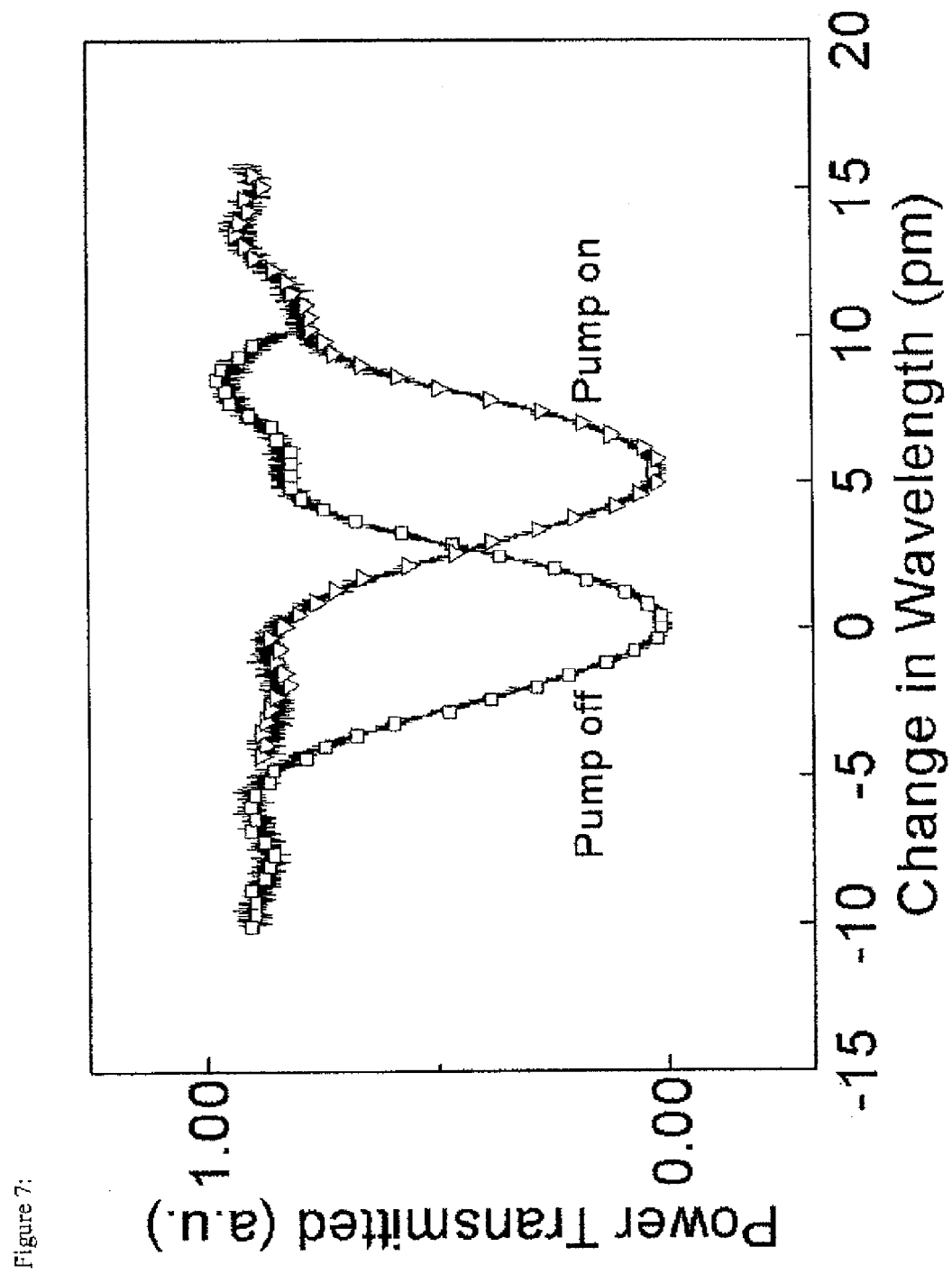
FIG. 7 is a plot of measured transmission spectra of the output of an example optical switch compatible with certain embodiments described herein, with and without the pump pulse, showing a shift in the resonance wavelength shift when the pump is on at a peak-coupled power of 3.4 microwatts.

FIG. 7 is a plot of the transmission spectrum of an example microsphere switch measured with and without the pump to illustrate switching. The resonance of FIG. 7 (with the pump either on or off) has a full-width-at-half-maximum (FWHM) of 4.8 picometers. Since the Q-factor is by definition related to the resonance linewidth $\Delta\lambda$ by $\Delta\lambda=\lambda_s/Q$, where $\lambda_s$ is the central signal wavelength, this measurement implies that the measured Q is approximately equal to (0.0048/1450), or approximately $3 \times 10^5$. The measured shift in resonance wavelength in FIG. 7 is approximately 5 picometers for approximately 3.4 microwatts of pump power absorbed by the microsphere. This shift is observed to increase with increasing pump power. Thus, the resonance shift in FIG. 7 is approximately equal to one linewidth of the signal, and is sufficient to fully switch between the "off" state and the "on" state of the optical switch.

This switching power agrees well with the value of 2.9 microwatts predicted earlier by theory. From this measured value and the length of the microsphere (150 micrometers), the calculated PL product of the exemplary switch is $5.1 \times 10^{-10}$ watt-meter, or a factor of 3 lower than the values calculated from previously reported observations (see, e.g., Tapalian et al.). In reference microspheres having silica coatings which did not contain Si nanocrystals, the shift induced by the pump pulse was measured to be smaller than that shown in FIG. 7 by a factor of approximately 3.3. Thus, the pump power necessary to induce a wavelength shift comparable to that of FIG. 7 using a microsphere without the nanocrystals is approximately a factor of 3.3 higher than the pump power for a microsphere with the nanocrystals. This result confirms that the nanocrystals of the example switch increase the pump absorption and thus reduce the switching energy requirement significantly.

Figure 8:
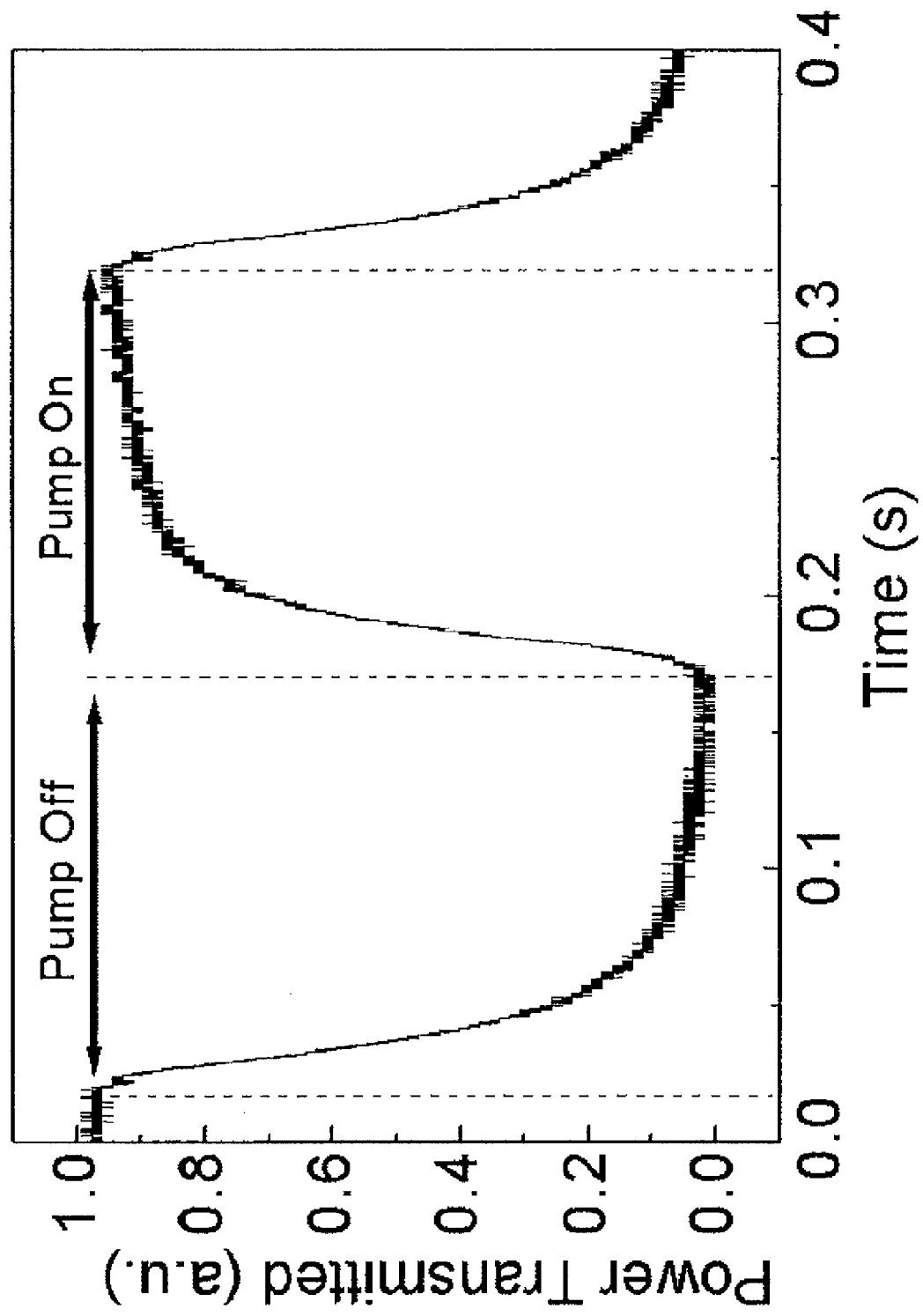
FIG. 8 is a plot of the temporal response of the example optical switch of FIG. 3.

FIG. 8 is a plot of the temporal response of the example switch of FIG. 7. The temporal response was measured by tuning the signal to a resonance and adjusting the spacing between the tapered fiber and the microsphere for critical coupling (e.g., zero transmitted signal power). The pump pulses were then turned on (150-millisecond width, 50% duty cycle, sub-millisecond rise and fall time) and the signal power transmitted by the tapered fiber was recorded as a function of time.

In certain embodiments, longer pump pulses having lower peak power are used to excite the microsphere. The heat deposited by a relatively long pump pulse (e.g., on the order of 100 milliseconds) has time to migrate through the entire microsphere before the end of the pump pulse, rather than remaining solely in the mode volume. As used herein, the term "mode volume" refers to the volume of the microresonator (e.g., microsphere) in which most (e.g., 95%) of the signal energy resonating with the microresonator (e.g., whispering gallery mode) is located in the microresonator. The amount of heat deposited in the microsphere by the pump pulse is then greater than if only the mode volume were heated, thus the switching energy is higher. After a pump pulse has traveled through the microsphere, it then takes considerably longer (e.g., by a factor of approximately 100, corresponding to the ratio of the microsphere dimension to the mode dimension) for the larger amount of heat to migrate out of the microsphere into the surrounding medium (e.g., air). Stated differently, the microsphere takes longer to cool down, and therefore the fall time of the switch is correspondingly longer than if the pump pulse had been shorter. Certain such embodiments are advantageously used in applications in which the optical switch is maintained in the "off" state for longer periods of time.

In certain embodiments, as schematically illustrated by FIG. 8, the falling and rising edges of the switched pulse are approximately exponential, as expected from basic physics. Fitting an exponential to the two edges gives a rise time constant of 25±5 milliseconds and a fall time constant of 30±5 milliseconds. The latter result agrees well with the value calculated from V. S. Il'chenko et al. for the exemplary microsphere's dimensions. In certain other embodiments utilizing a shorter pump pulse, as described more fully below, the fall time is considerably shorter (e.g., a few microseconds). The fall time is determined at least in part by the time required for the microsphere temperature to reach equilibrium with the surrounding medium after the pump pulse has been turned off. In certain embodiments in which a microtoroid is used instead of a microsphere, the fall time is faster since the microtoroid has a smaller thermal mass than the microsphere (see, e.g., D. K. Armani, B. Min, A. Martin, K. J. Vahala, "*Electrical thermo-optic tuning of ultrahigh-Q microtoroid resonators,*" Applied Physics Letters, Vol. 85, No. 22, pages 5439-5441, November 2004).

The rise time of the optical switch is determined at least in part by the rate at which heat is deposited into the microsphere (e.g., by the pump power for a fixed pump energy). In certain such embodiments, as the pump power is increased, the rise time increases. In certain embodiments, such as that of FIG. 8, it is purely coincidental that the measured rise and fall time constants are comparable. From the measured rise time and measured absorbed pump power for the device corresponding to FIGS. 7 and 8, the total energy required for full switching (namely, the energy for shifting the resonance wavelength by one linewidth) is estimated to be 3.4 microwatts multiplied by 25 milliseconds, or approximately 85 nanojoules. This result is a factor of approximately 30 lower than reported earlier (see, Tapalian et al.). In certain other embodiments described more fully below, the switching energy is on the order of a few hundred picojoules or lower.

Temporal Features of the Thermal Response

In certain embodiments, a microresonator (e.g., a microsphere or a microtoroid) pumped optically by exciting a resonant whispering gallery mode heats up due to absorption of the pump photons in (or very near) the mode volume. The deposited heat raises the temperature of the mode volume, which changes the refractive index (and, to a lesser extent, the dimension of the microresonator), and thus changes all resonance wavelengths. As described above, this effect is used in certain embodiments to switch or modulate the amplitude of an optical signal of fixed wavelength tuned to one of the resonances of the microresonator. When propagating through a nanowire (e.g., a tapered optical fiber) optically coupled to the microresonator when the pump is off, the optical signal resonates with the microresonator, and only a small fraction, if any, of the optical signal propagates out of an output portion of the nanowire (e.g., zero transmission through the nanowire). When propagating through the nanowire when the pump is on, the optical signal is off resonance and a large fraction of the optical signal is transmitted through the output portion of the nanowire (e.g., 100% transmission through the nanowire). When the pump is modulated into pulses, the temperature of the mode volume increases and decreases each time a pump pulse is sent through, thereby alternatively turning the signal on and off.

The temporal response of microcavities to thermal excitations cannot be neglected when considering the optical properties of these microcavities (see, e.g., T. Carmon, L. Yang, and K. J. Vahala, "*Dynamical thermal behavior and thermal self-stability of microcavities,*" *Optics Express*, Vol. 12, No. 20, pages 4742-4750, October 2004). The temporal response of the microresonator, and thus the temporal shape of the switched signal and its dependence on the width and spacing of the pump pulses, are qualitatively discussed below for certain embodiments in which the microresonator comprises a microsphere. Similar behavior is exhibited by certain other embodiments with other types of microresonators (e.g., microtoroids).

As described by V. S. Il'chenko and M. L. Gorodetskii, cited previously, the temporal response of a microsphere is dictated by two thermal time constants: (i) the fast time constant $\tau_1$ of the mode volume (of the order of a few microseconds), and (ii) the slower time constant $\tau_2$ of the entire microsphere (of the order of tens of milliseconds). If an extremely short pump pulse is launched into the mode volume, the mode volume heats up instantly, and while the pump pulse is on, the heat stored in the mode volume does not have time to diffuse out of the mode volume. After the pump pulse has passed through, the heat flows out of the mode volume. If the temperature rise is modest, this heat flow occurs mostly into the microsphere via heat conduction, as well as into the surrounding medium (e.g., air) via, for example, natural heat convection. $\tau_1$ is the time constant that characterizes how fast heat flows out, or equivalently how fast the temperature of the mode volume drops, or how fast the switched signal returns to its unswitched (off) state. If the temperature drop exponentially, after a time $t=\tau_1$, the signal power is down from its switched power by 1/e, after $2\tau_1$ by $1/e^2$, etc. In certain embodiments, the switched signal is considered to be back to its unswitched state after $3\tau_1$-$10\tau_1$, depending on the signal extinction ratio utilized in the application at hand.

Similarly, $\tau_2$ characterizes the time it takes the heated microsphere (as opposed to the mode volume) to cool down (e.g., to room temperature $T_0$) after the source of heat has been turned off. In certain embodiments, the only heat loss mechanism is into the surrounding air via natural convection. Again, typically one can wait a few $\tau_2$'s before the vast majority of the heat stored in the microsphere has been drained and the microsphere temperature is essentially back to room temperature.

To illustrate how the temporal shape of the sequence of switched signal pulses generated by such an optical switch depends on the duration and repetition rate of the pump pulse relative to these two time constants in various embodiments, the discussion below addresses three different pump pulse sequences.

Short, Low-Repetition-Rate Pump Pulse Sequence

In certain embodiments, the pump pulse sequence has two characteristics: (1) each pump pulse has a duration $\tau_p$ short enough that the heat generated by the pump pulse does not have time to flow out of the mode volume while the pump pulse is on, and (2) a repetition rate (corresponding to a pulse-to-pulse spacing $T_p$) low enough that all the heat generated by one pump pulse has time to drain out of the microsphere (e.g., by natural convection) before the next pump pulse arrives. As illustrated in FIG. 7, each pump pulse injects a delta-function-like impulse of heat into the microsphere, the mode volume temperature increases sharply, the signal moves rapidly to its switched state, then quickly returns to its unswitched state after the pump pulse is off, and is fully in the unswitched state by the time the next pump pulse arrives. This pump pulse sequence configuration produces the shortest possible rise time and fall time for the switched signal pulses, albeit also a low repetition rate. Such a pump pulse sequence configuration is used in certain embodiments to verify experimentally the existence and value of the short time constant $\tau_1$.

Characteristic (1) described above imposes that the pump pulse duration is shorter than $\tau_1$. However, if the pump wavelength $\lambda_p$ is tuned to a resonance and if the Q of the microsphere at $\lambda_p$ is too high, the time it will take the pump pulse to be completely absorbed may exceed $\tau_1$, in which case this condition can just not be satisfied. As an example, consider a silica microsphere (refractive index n=1.44) with a diameter D=150 micrometers and a quality factor at the pump wavelength of $Q_p=10^7$. The time of flight of the pump pulse once around the microsphere is $t_0 \approx 2.3$ picoseconds, and the time it takes for all the pump energy of the pump pulse to be absorbed is of the order of the microsphere time constant $Q_p t_0 \approx 23$ microseconds. To be fully resonating, and thus fully absorbed, the pump pulse advantageously has a duration of the same order as the microsphere time constant. Thus, if a pump pulse of duration $\tau_p=23$ microseconds is sent into the microsphere, since $\tau_p$ is large compared to $\tau_1$ (typically a few microseconds), the heat generated by the pump pulse will start migrating out of the mode volume well before the pump pulse is off. In certain such embodiments, the switch is slow since it then takes much longer for the switched signal to return to its unswitched state. In certain embodiments, $Q_p$ is selected to be sufficiently low to avoid this condition. For example, if $Q_p$ is only $10^5$, then the time for all the pump energy to be absorbed is reduced to approximately 0.23 microsecond. For a pump pulse of duration $\tau_p=0.23$ microsecond, $\tau_p$ is sufficiently small as compared to $\tau_1$ so that the heat generated by the pump pulse advantageously remains in the mode volume while the pump pulse is on. In certain embodiments, the presence of Si nanoparticles on the surface of the microsphere results in a low value of $Q_p$ (e.g., less than $10^3$, or less than 10), and characteristic (1) is satisfied even if extremely short pulses (as short as 2.3 picoseconds for a 150-micrometer diameter sphere) are used.

Characteristic (2) described above imposes that the time $T_p$ between consecutive pump pulses be much larger than $\tau_2$. A value of $T_p$ of the order of a few $\tau_2$ or longer is adequate in practice to satisfy characteristic (2).

Figure 9:
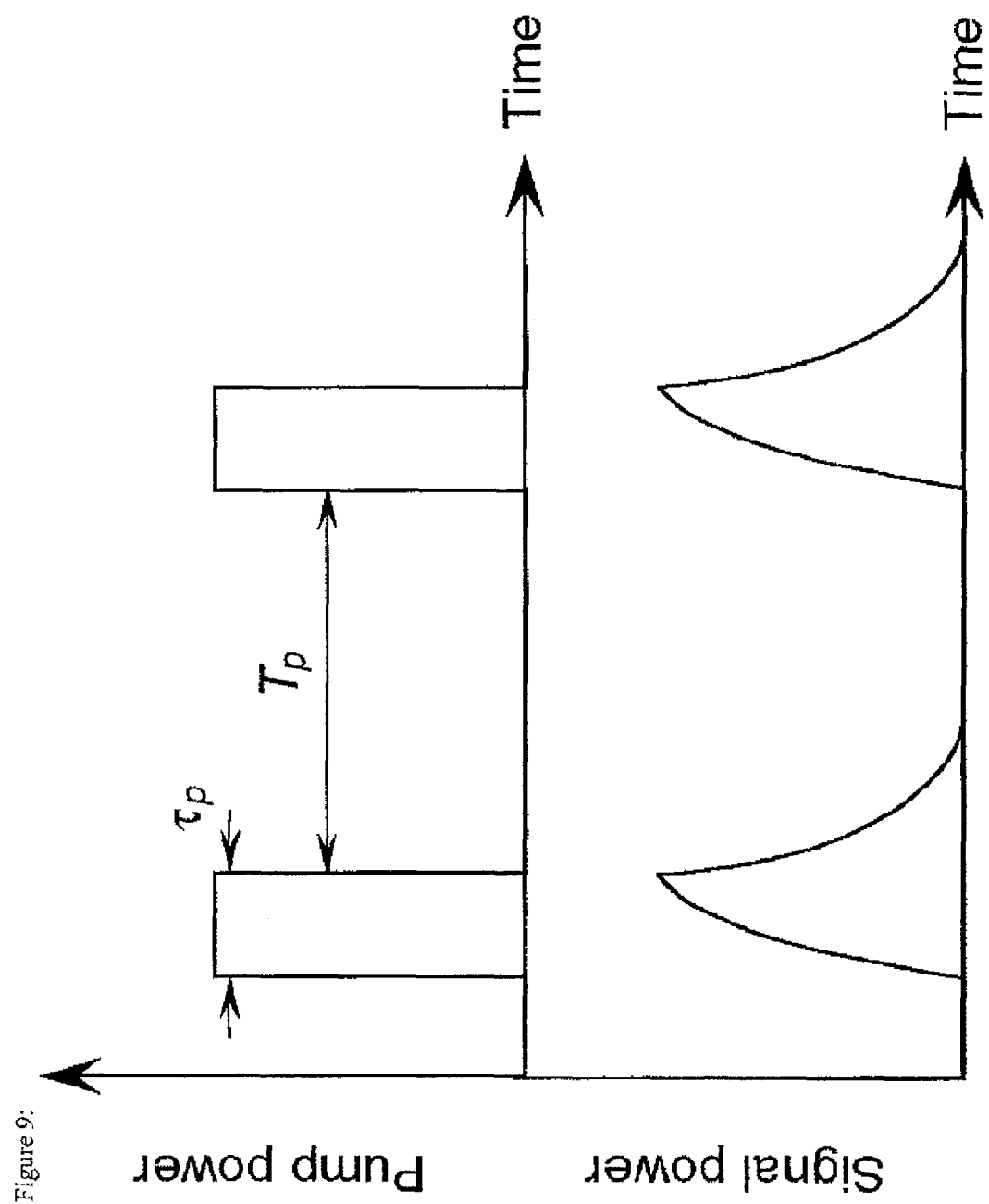
FIG. 9 is a diagram of an example pump pulse sequence and resulting switched signal pulses in accordance with certain embodiments described herein.

Referring to FIG. 9, the rise time of the switched pulses depends in a complicated way on the rate of absorption of the pump energy. As used herein, $E_1$ refers to the pump energy that is deposited in the mode volume to shift the resonance wavelength of the signal by one half-width at half resonance (HWHM) linewidth, defined above as $\Delta\lambda$. As used herein, this amount of energy is referred to as the switching energy $E_s$. Note that in other embodiments, fully switching the signal with a high extinction ratio might require that the resonance be shifted by more than one linewidths (e.g., of the order of 3-10 linewidths, depending on the lineshape and the desired degree of extinction). In certain such embodiments, the energy required for switching the signal fully is of the order of $3E_1$-$10E_1$. In the discussion below, full switching is assumed to require a shift of one linewidth (i.e., $E_s = E_1$).

For a given pump pulse energy $E_y$ and duration $\tau_p$, the signal is fully switched when the absorbed pump energy reaches $E_s$. If $E_p$ is smaller than $E_s$, then this condition for full switching is not reached, so that at the end of the pump pulse, the signal is only partially switched. The rise time $t_r$ of the switched signal (defined as the time it takes the signal to be switched from its minimum or unswitched value to its maximum value) is then simply equal to $\tau_p$. If $E_p$ is larger than $E_s$, then the signal will reach its fully switched state when the fraction $E_s$ of the pulse energy is absorbed. The amount of time for the portion $E_s$ of a pulse of energy $E_p$ to be absorbed by the mode volume depends on the value of $\tau_p$ compared to the microsphere time constant $Q_p t_0$, where $t_0$ is the time of flight of a pump photon once around the microsphere. If $\tau_p > Q_p t_0$, then the pump pulse is resonating and the amount of time for absorbing the pulse is $(E_s/E_p)\tau_p$. If $\tau_p < Q_p t_0$, then the pump pulse does not last long enough to be fully resonating, so it is not fully absorbed. Thus, unless the pump pulse is extremely short, when $E_p \geq E_s$ the rise time of the switched pulse is $t_r \approx (E_s/E_p)\tau_p$.

In certain embodiments, $E_p$ is chosen to be slightly larger than $E_s$. After $t = t_r$, the remaining pump energy ($E_p - E_s$) continues to be absorbed, the temperature of the mode volume continues to rise, and the resonance wavelength continues to shift. However, since the signal is already fully switched, the additional shift that takes place after $t_r$ has no effect on the switched signal, and the remaining pump energy is just wasted. Therefore, from an energy efficiency standpoint, for certain embodiments, it is best to select a pump energy equal to the switching energy, $E_p = E_s$. The rise time of the switched signal pulse is then $t_r = \tau_p$.

In certain embodiments, the pump pulse duration is shorter than $\tau_1$ and is larger than $Q_p t_0$. For an example microsphere with D=150 micrometers and a low $Q_p$, $Q_p t_0 \approx 10$ picoseconds and $\tau_1 \approx 3$ microseconds, and $\tau_p$ is between approximately 10 picoseconds and a few microseconds. The rise time in certain such embodiments is of the order of $\tau_p$.

Figure 10:
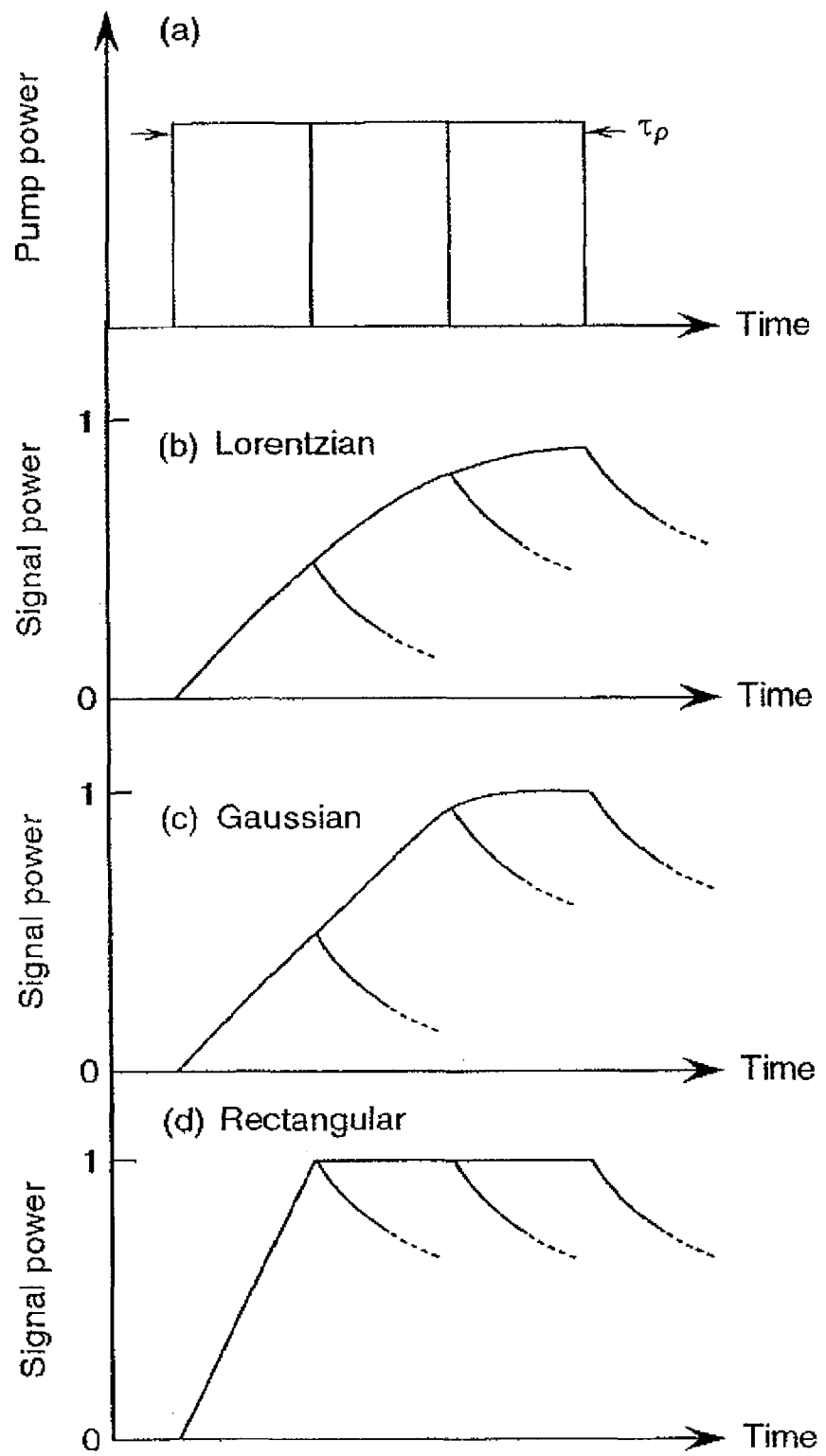
FIG. 10A is a diagram of three short pump pulses having the same peak power but different widths, with each width being much shorter than $\tau_1$.
FIG. 10B is a diagram of a resulting switched signal pulse corresponding to FIG. 10A for a resonance lineshape that is Lorentzian.
FIG. 10C is a diagram of a resulting switched signal pulse corresponding to FIG. 10A for a resonance lineshape that is Gaussian.
FIG. 10D is a diagram of a resulting switched signal pulse corresponding to FIG. 10A for a resonance lineshape that is rectangular.

In certain embodiments, the magnitude of the switched pulses is controlled by a combination of the energy (or peak power) and the duration of the pump pulse. FIG. 10A shows an example of three pump pulses with the same peak power but with three different widths, namely $\tau_p/3$, $2\tau_p/3$, and $\tau_p$, all much shorter than $\tau_1$. The peak power $P_p$ is selected such that for the maximum of the three widths, the pulse energy $E_p = P_p \tau_p$ is equal to $3E_1$.

In certain embodiments, the microresonator has a Lorentzian resonance:

$$y(\lambda) = 1 - \frac{1}{1 - \left(\frac{\lambda - \lambda_0}{\Delta\lambda}\right)^2} \qquad (2)$$

where $\lambda_0$ is the center wavelength of the unswitched signal. This definition corresponds to the description above in which $\Delta\lambda$ is the HWHM. For the largest of the three widths ($\tau_p$), by definition of $E_1$ ($E_p = 3E_1$) at the end of the pump pulse (time $t = \tau_p$), the signal resonance has shifted by $3\Delta\lambda$. Thus, using Equation (2), the signal transmission at the peak of the switched state is $y(\lambda) = 1 - 1/(1+3^2) = 0.9$, as shown in FIG. 10B. To increase the signal transmission to be closer to unity, certain embodiments either increase the pulse peak power or increase the pulse duration. If the pump pulse width is reduced to $2\tau_p/3$, then the switched pulse has the same rising edge except that it ends at $2\tau_p/3$ instead of $\tau_p$. The shift in the resonance wavelength in such embodiments is only $2\Delta\lambda$, so the maximum amplitude of the switched signal is reduced to $1-1/(1+2^2) = 0.8$, as shown in FIG. 10B. Similarly, for the shortest of the three pump pulses (having a width $\tau_p/3$), the maximum switched signal amplitude is even lower, down to $1-1/(1+1^2) = 0.5$, as shown in FIG. 10B.

In certain embodiments, the shape of the resonance function affects the shape of the switched pulse's rising edge (e.g., the gradual leveling of the switched pulse as t increases from 0 to $\tau_p$). If the resonance is Gaussian instead of Lorentzian, the lineshape function is:

$$y(\lambda) = 1 - \exp\left(-\ln(2)\left(\frac{\lambda - \lambda_0}{\Delta\lambda}\right)^2\right) \qquad (3)$$

where the $\ln(2)$ factor ensures that $y(\lambda)$ is consistent with the definition of $\Delta\lambda$ as the HWHM width. For a pump pulse width of $\tau_p$, the maximum amplitude of the switched signal is given by Equation (3) to be $1-\exp(-\ln(2)\times 3^2) = 0.998$, as shown in FIG. 10C. This amplitude is much closer to unity than the amplitude obtained from a Lorentzian resonance with the same pump pulse width, as shown in FIG. 10B, because a Gaussian has shallower tails than a Lorentzian. As shown in FIG. 10C, the switched signal is much more abrupt for a Gaussian resonance than for a Lorentzian resonance.

As shown in FIG. 10D, for a resonance lineshape which is hypothetically rectanglular having a HWHM of $\Delta\lambda$, the switched signal reaches its maximum amplitude even more abruptly than for either a Gaussian or a Lorentzian resonance. In fact, this maximum is reached when the resonance has shifted by only $\Delta\lambda$. Note that for a rectangular resonance lineshape, since the shift to achieve maximum amplitude is $\Delta\lambda$ instead of $3\Delta\lambda$, the switching energy is reduced by a factor of three to $E_p = E_1$.

In certain embodiments, the fall time of the switched pulses is dictated solely by time it takes the heat to drain out of the mode volume by convection. Thus, in certain such embodiments, the fall time is simply equal to the thermal time constant $\tau_1$. By measuring this fall time, the value of $\tau_1$ can be directly obtained.

Long Pump Pulses with Low Repetition Rate

In certain embodiments, the pump pulses are much longer than $\tau_1$ and spaced by a time $T_p$ (approximately 200 milliseconds) much longer than $\tau_2$ (e.g., at most tens of milliseconds). $T_p$ is now long enough that the microsphere has ample time between pump pulses to fully cool down to room temperature. There is no net build-up of heat in the microsphere over time, so the discussion below focuses on the effects during a single pump pulse.

In certain such embodiments, the start of the pump pulse is at time $t=0$, and from $t=0$ to $t \approx \tau_1$, heat accumulates in the mode volume and does not have time to move very far out of it. Heat flows at a rate of approximately one mode volume characteristic width w (e.g., one or two microns for a typical microsphere) per $\tau_1$, so between $t=0$ and $t=\tau_1$, heat flows approximately w. However, up until the end of the pump pulse at $t=\tau_p$, the heat generated in the mode volume has time to diffuse into the bulk of the microsphere (e.g., at $t=2\tau_1$, the heat has flowed approximately 2w, at which time the heated volume is significantly larger than the mode volume). Simultaneously with the diffusion of heat from the mode volume, more heat is injected into the mode volume, and the temperature gradually climbs throughout the microsphere. As the temperature of the microsphere rises, a second cooling mechanism becomes more effective, namely natural convection into the air through the surface of the microsphere. The higher the mean temperature of the surface of the microsphere, the more dominant this second mechanism becomes. For a given resonance lineshape, the shape of the switched signal depends again on the energy in the pump pulse.

Figure 11:
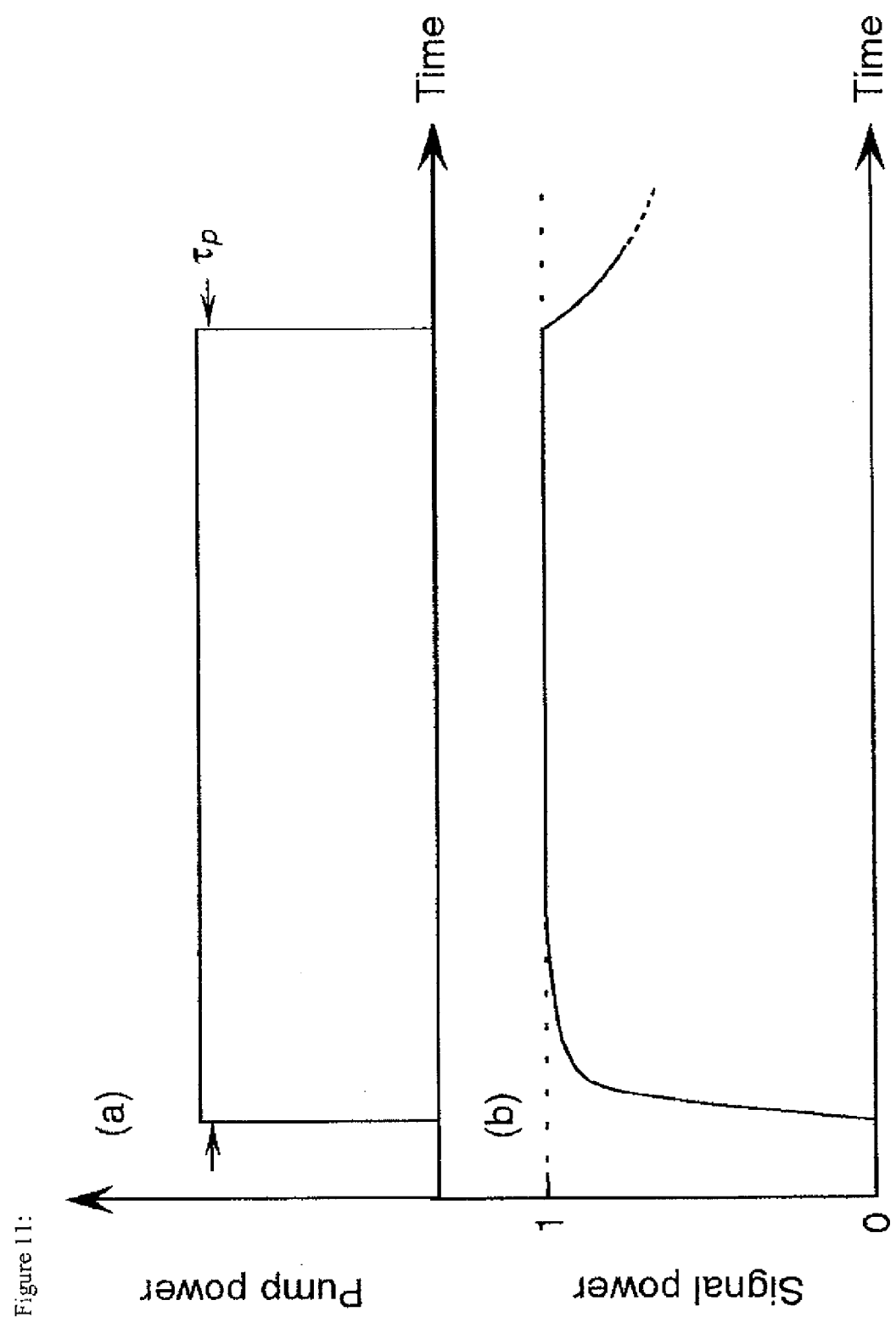
FIG. 11 is a diagram of a pump pulse having a long width as compared to the relaxation time of the mode volume ($\tau_p=50\tau_1$) and the resulting switched signal pulse for a Lorentzian resonance lineshape.

As an example, consider a Lorentzian resonance and a pump pulse with a width $\tau_p=50\tau_1$ and a peak power such that $E_p=P_p\tau_p=200E_1$, as schematically illustrated by FIG. 11A. The start of the rising edge of the switched signal retains the same shape as in FIG. 10B up until time $t\approx\tau_1$. At $t=\tau_1$ the amount of heat deposited in the mode volume is $4E_1$, so the resonance wavelength has shifted by $4\Delta\lambda$. For the Lorentzian resonance lineshape, the signal is switched at 94%. As time goes on during the pulse, the heat deposited by the pump pulse flows from the mode volume towards the center of the microsphere and into the surrounding air. The temperature of the mode volume continues to rise, but more slowly, so the resonance wavelength continues to shift away from $\lambda_0$, but also more slowly. Note that the wavelength shift does continue indefinitely simply because the microsphere temperature cannot increase indefinitely. As the surface temperature of the microsphere increases, the quantity of heat flowing out of the surface per unit time due to convection, which is proportional to the temperature difference between the surface and the air immediately surrounding it, also increases. Once the surface temperature reaches the steady-state value $T_{ss}$ for which the outflow of heat per unit time due to convection is equal to the input of heat per unit time from the pump pulse, the microsphere stops heating up.

In this exemplary embodiment, the only portion of the pulse energy that is useful in inducing switching is approximately $(\tau_1/\tau_p)E_p$. Therefore, to switch the signal on and off as fast as possible in certain such embodiments, the pump pulse is advantageously turned off after about $\tau_1$. The rest of the pump pulse energy serves to maintain the signal in the switched state, a feature that is useful in some applications.

Note that in certain embodiments described above, the resonances of the microresonator are assumed to be sufficiently far apart that when a large resonance shift (e.g., a shift of the order of 200 linewidths) is induced, the signal does not resonate with other resonances which have moved to the signal wavelength such that the signal consequently remains in the switched state. If this assumption does not apply, after a sufficiently large shift (for example, a shift of more than a few linewidths), the signal wavelength will go through or reside near the next resonance wavelength, and the signal power at the output of the tapered fiber will drop again. In certain embodiments, the optical switch can be designed using standard, well-known interferometry formulas to model the center wavelengths and widths of the resonances of the microresonator to determine a wavelength shift range that can be tolerated by the optical switch. However, these center wavelengths and widths are typically critical functions of generally non-measurable physical details of the microresonator structure, including but not limited to shape, dimensions, refractive index, and spatial distribution of the (often inhomogeneous) refractive index. Predicting these parameters theoretically with the required precision to model the resonances of the microresonator can be very difficult. In such cases, it is simpler to access data regarding the resonances of the microresonator through measurements using well-known and straightforward techniques.

A main difference between the embodiment illustrated by FIGS. 11A and 11B and the embodiment illustrated by FIGS. 10A and 10B is that because the pump pulse of FIG. 11A is much longer than that of FIG. 10A, not just the mode volume is heated by the end of the pump pulse, but also the microsphere. After the pump pulse ($t>\tau_p$), it takes much longer for this heat to drain out of the microsphere than for a short pump pulse (which only heats the mode volume). Therefore, the fall time is much longer, as illustrated in FIG. 11B. Quantitative estimation of the fall time can be made using a full-blown calculation of heat flow out of the microsphere. However, even without performing such a calculation, it is clear that the fall time is longest in embodiments in which the pump pulse width is equal to or longer than a few microsphere time constants $\tau_2$. In certain such embodiments, the microsphere reaches its maximum possible temperature for this peak pump power since the stored heat is maximized and the time for this heat to fully diffuse out of the microsphere is also maximized. In certain such embodiments, the fall time then approaches $\tau_2$, such that the fall time is between $\tau_1$ and $\tau_2$. In certain embodiments in which the pump pulse is on for approximately 200 milliseconds (which is many times $\tau_2$), the fall time is very close to $\tau_2$. This discussion explains the measured fall time of 30±5 milliseconds described above, which is close to the value of $\tau_2$ predicted for this microsphere based on the theory of V. S. Il'chenko and M. L. Gordetski, cited above.

Figure 12:
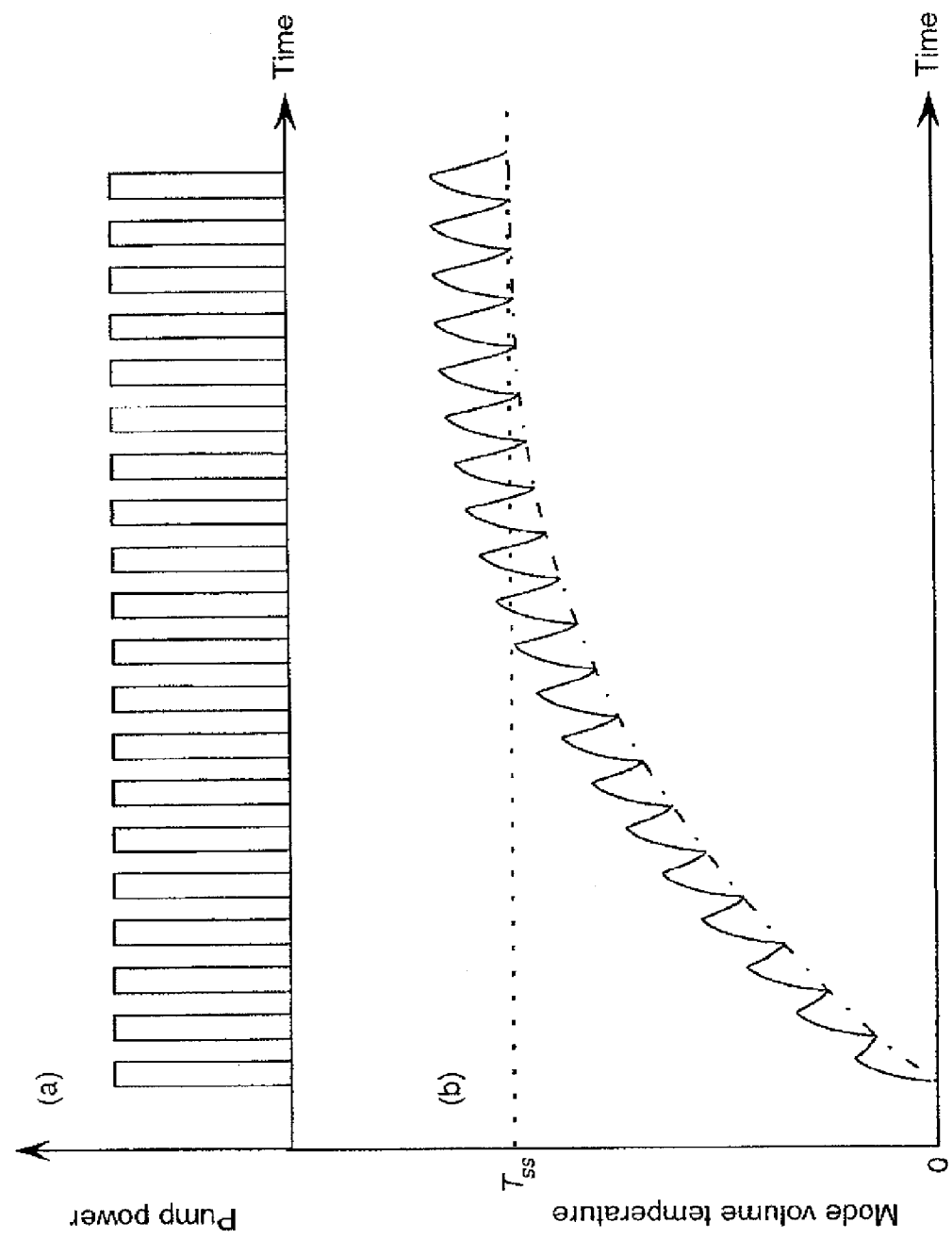
FIG. 12A is a diagram of a pump pulse sequence with a high repetition rate ($T_p<<\tau_2$).
FIG. 12B is a diagram of the resulting sequence of switched signal pulses corresponding to FIG. 12A, with the dash-dotted curve representing the evolution of the mode volume baseline temperature.

FIG. 12A illustrates an example pump pulse sequence with a pulse-to-pulse spacing $T_p$ much smaller than $\tau_2$. Unlike in the embodiments described above, because $T_p \ll \tau_2$, the microsphere in this embodiment does not have sufficient time between pulses to fully cool down to room temperature, and heat builds up in the microsphere over time. As a result, the mean temperature of the microsphere rises gradually, and so does that of the mode volume, as shown qualitatively by the dash-dotted curve in FIG. 12B. The jagged curve of FIG. 12B represents the instantaneous temperature rise of the mode volume. After some time, of the order of a few $\tau_2$'s, the surface temperature of the microsphere reaches the steady-state value $T_{ss}$ for which the heat flow out of the microsphere per pulse spacing $T_p$ due to convection into air (or whatever other form of external coating is supplied, for example, forced convection, conduction in a liquid, etc.) is equal to the input of heat from each pump pulse. Under such conditions, the microsphere stops heating, and its temperature levels off, as shown in FIG. 12B: the dash-dotted curve asymptotically approaches the dotted line, which represents the steady-state temperature of the microsphere's surface.

One feature of note shown by FIG. 12B is the shape of the individual successive temperature spikes in the jagged curve. Careful examination of FIG. 12B shows that this shape evolves from the start of the pump pulse train (t=0) to the time when the microsphere temperature reaches $T_{ss}$. The heights and rise times are substantially constant for all the temperature spikes, but the fall time gets shorter as the steady-state is approached. In the first few pulses, the temperature of the microsphere is not very far above room temperature, and convection plays a negligible role such that the microsphere and the mode volume both heat up fairly rapidly, shown by the high slope in the dash-dotted curve of FIG. 12B. With increasing time, the temperature of the mode volume increases, the cooling due to convection gets more efficient, which means that the mode volume is able to cool down further between consecutive pump pulses than it did at the start of the pump pulse sequence. Thus, the fall time of the successive temperature spikes in FIG. 12B gets shorter and shorter with each successive pump pulse. Eventually, the fall time is such that by the time the next pump pulse arrives, the temperature of the mode volume falls back to the value it had at the start of the previous pump pulse. At this point, the system has reached thermal steady state such that the fall time remains at its steady-state value and the temperature of the mode volume is the same at the start of each pump pulse.

In certain embodiments, the plot of resonance wavelength versus time is substantially identical to the instantaneous temperature curve of FIG. 12B. The resonance wavelength shifts not only while a pump pulse is on, but also between pulses. Eventually, steady-state is reached, and with each pump pulse, the signal wavelength shifts back and forth between the same extreme values.

In certain embodiments, this temperature (and resonance wavelength) profile does not generally translate into a very useful switched signal pattern. If at time t=0 the signal is on resonance at wavelength $\lambda_0$, as the baseline temperature of the mode volume increases, the mean resonance wavelength shifts from $\lambda_0$. If the mean temperature rise of the microsphere is large enough, the resonance wavelength at steady-state will be so far away from $\lambda_0$ that the signal will always be in the switched state. In certain embodiments, this effect can of course be used to maintain a signal in the on state or the off state. It can also be used in certain embodiments to produce periodic switched signal pulses by tuning the signal wavelength to the resonance wavelength of the microsphere when the mode volume is at temperature $T=T_{ss}$. In certain such embodiments, the switch can be operated at a much higher repetition rate (with smaller pulse spacing $T_p$) than possible if the signal wavelength was tuned to a resonance of the microsphere at ambient temperature $T_0$.

In certain embodiments, the optical switch is fiber pigtailed, so it is advantageously easily interfaced with optical fiber components and optical fiber systems. In certain embodiments, the optical switch is extremely small (e.g., having a microsphere of only 50-200 microns in diameter). In certain embodiments, the optical switch utilizes very little pump energy to be activated from an "off" state to an "on" state. The microresonator of certain embodiments has a high-Q at the signal wavelength (e.g., on the order of $10^5$ or higher), so the resonances are extremely sharp. One contribution to the sharpness of the resonance is that only a small change in the refractive index is sufficient to shift the resonance away from the narrowband signal wavelength by one or more resonance linewidths. Another contribution to the sharpness of the resonance is that the volume of silica in which the mode travels (namely, the mode volume) is very small, so only a small amount of heat is sufficient to change its temperature, and thus its refractive index.

In certain embodiments, the fall time of the switch is advantageously fast when the mode volume is sufficiently small (e.g., having a transverse dimension approximately equal to the wavelength of the signal) so that only a small amount of time is taken for heat to diffuse out of the mode volume, once the pump pulse is gone. The rise time of certain embodiments is reduced by reducing the rise time of the pump pulse (e.g., under a nanosecond), and the fall time is only a few microseconds. In certain embodiments, the microsphere is actively cooled (e.g., by forcing cooling air across the surface of the microsphere) to shorten the fall time. In certain embodiments, the switching power is extremely low (e.g., on the order of 100 nanowatts or less). Thus, the switching energy of certain embodiments is on the order of $10^{-13}$ joules.

Reducing Fall Time and/or Switching Energy

Various approaches are compatible with certain embodiments described herein to reduce the fall time of the microresonator switch when the switch is pumped with pulses sufficiently long such that a substantial portion of the microresonator volume is heated by the end of the pulse. Some of these approaches rely on modifying the shape of a microresonator (e.g., microsphere) in order to reduce its volume and thus reduce the volume that is heated, and thereby reduce the fall time of the microresonator. In certain embodiments, this modification has the important additional benefit of reducing the amount of pump power that is needed for switching the optical signal.

In certain embodiments, the mass of the microresonator is advantageously reduced, thereby reducing the time for the microresonator to cool down and the fall time of the optical switch. In certain such embodiments, the microresonator comprises a microsphere from which at least one portion of the microsphere, away from the mode volume, (e.g., the core) has been removed. Depending on the microresonator material and the size and shape of the removed portion, the removal can be performed using a variety of conventional techniques, including but not limited to, reactive ion etching, chemical etching, and laser ablation.

Figure 13A:
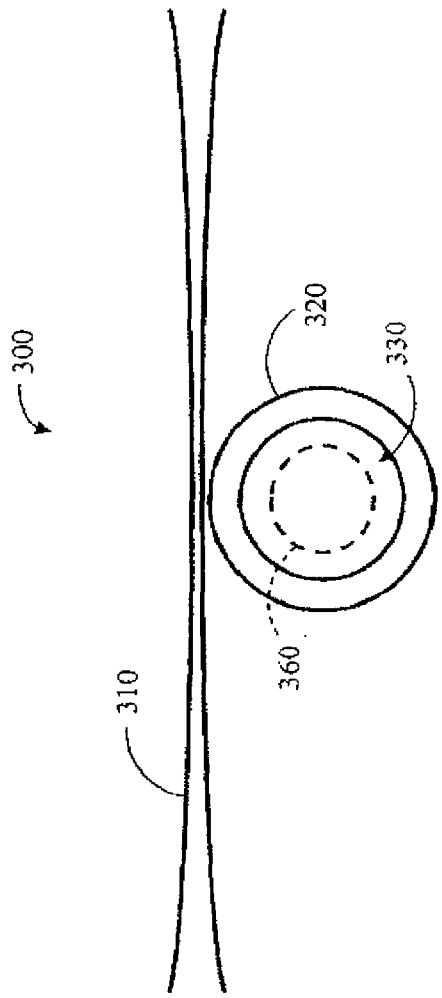
FIGS. 13A and 13B schematically illustrate a side view and a top view, respectively, of one example optical switch comprising a microresonator compatible with certain embodiments described herein.
Figure 13B:
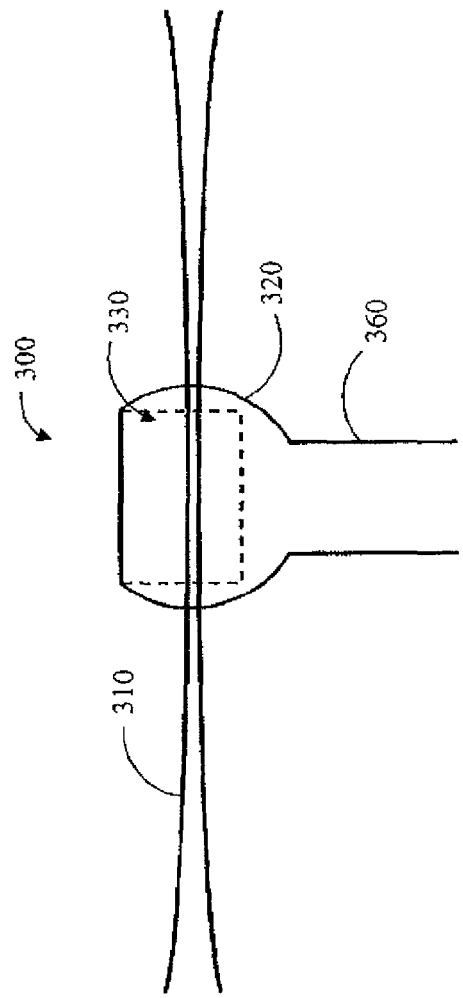

FIGS. 13A and 13B schematically illustrate a side view and a top view, respectively, of one example configuration of an optical switch 300 comprising a bi-tapered optical fiber 310 and a microresonator 320 optically coupled to the optical fiber 310 in accordance with certain embodiments described herein. The configuration shown in FIGS. 13A and 13B comprises a hole 330 formed (e.g., etched or drilled) through the top portion of the microsphere 320, where the top 350 is defined as the end of the microsphere 320 opposite from the fiber post 360 to which it is attached. The hole 330 does not go all the way through the microsphere 320 but stops some depth into the microsphere 320. The depth and diameter of the hole 330 determine the volume of removed material, which determines the switch's fall time and switching energy. Since the depth of the hole 330 affects the mechanical strength of the microsphere 320, this depth is advantageously chosen so as not to compromise the microsphere's structural integrity. The hole 330 can be fabricated by a number of standard techniques, including but not limited to reactive ion etching, chemical etching combined with conventional masking techniques, mechanical drilling, etc. The hole 330 can have any other shape that is convenient to fabricate, or any shape that allows substantially the same volume removal while providing superior mechanical strength (e.g., a conical hole). In certain embodiments, more than one hole 330 can be drilled into the microsphere 320, at different locations, with different orientations and shapes. In certain such embodiments, the holes 330 advantageously do not get too close (within a few signal wavelengths) of the mode volume so that neither the signal nor the pump loss are increased by the presence of the holes 330.

FIGS. 14A and 14B schematically illustrate another example configuration of an optical switch 400 comprising a bi-tapered optical fiber 410 and a microresonator 420 optically coupled to the optical fiber 410 in accordance with certain embodiments described herein. The configuration shown in FIGS. 14A and 14B comprises removing the top of the microsphere 420, thereby producing a truncated or flat-topped microsphere 420. The microresonator 420 of FIGS. 14A and 14B can be fabricated by the same techniques as described above with regard to the microresonator of FIGS. 13A and 13B, as well as grinding and optionally polishing. In certain embodiments, the width of the top 450 is not so wide as to affect the loss of the pump and signal. Thus, in certain such embodiments, the flat top 450 is not closer than about a few wavelengths of the edges of the mode volume. The width of the top 450 determines the fall time and switching energy of the switch. In certain other embodiments, the top 450 is not flat (e.g., curved). In certain embodiments in which the top 450 is close to the equator of the microsphere 420, as in FIGS. 14A and 14B, essentially half of the microsphere volume has been removed. Thus, in certain such embodiments, the fall time and the switching energy have both been reduced by approximately a factor of two. In certain embodiments, the reduction of the fall time and the switching energy are also affected by the presence of the fiber post 460, which drains heat from the microsphere 420, thereby reducing the fall time but increasing the switching energy.

In certain embodiments, the switching energy of the microresonator is reduced by fabricating the microresonator from a microsphere formed from a smaller diameter fiber, and/or reducing the diameter of the post that holds the fiber, for example by chemical etching. Certain such embodiments advantageously reduce the amount of lost heat that flows out of the microsphere while it is pumped. By the same token, certain such embodiments advantageously increase the fall time of the switch, since now one of the paths through which heats migrates out of the microsphere during cooling has been made less efficient. The choice of the diameter of the post involves making a compromise between the fall time and the switching energy.

Figure 15A:
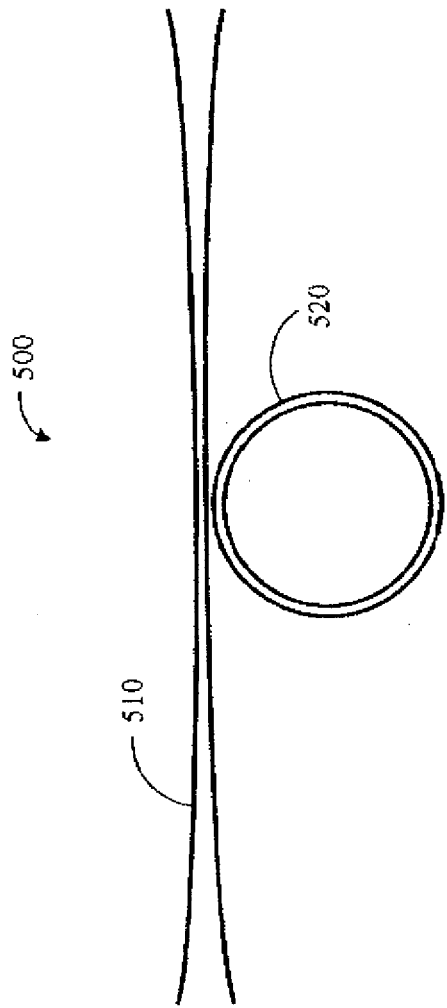
FIGS. 15A and 15B schematically illustrate a side view and a top view, respectively, of yet another example optical switch comprising a microresonator compatible with certain embodiments described herein.
Figure 15B:
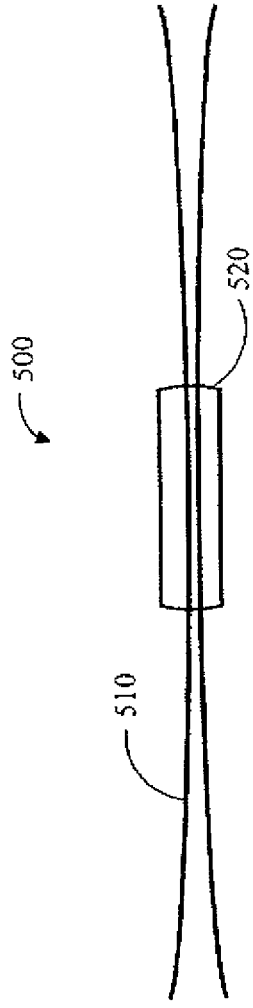

FIGS. 15A and 15B schematically illustrate a side view and a top view, respectively, of yet another example optical switch 500 comprising a bi-tapered optical fiber 510 and a microresonator 520 optically coupled to the optical fiber 510 in accordance with certain embodiments described herein. In certain embodiments, as schematically illustrated by FIGS. 15A and 15B, the post is completely removed, for example by grinding or chemical etching, and the microresonator is held onto a support by other mechanical means that minimize the contact surface (e.g., bonding). In certain such embodiments, the bonding substrate comprises a good thermal insulator (such as a polymer), thereby lowering the switching energy (at the cost of a slower fall time). In certain other embodiments, the bonding substrate comprises a good thermal conductor (such as a metal), thereby shortening the fall time (at the expense of a higher switching energy). After removal of the post, the bottom (post-side) of the microresonator 520 can be removed, as described above in relation to removing the top, thereby leaving a thin disk that can be again bonded either to a substrate or to a substrate via a small-diameter post. In certain such embodiments, as schematically illustrated in FIGS. 15A and 15B, the microresonator 520 resembles a microtoroid, in which most of the original microsphere material has been removed. In certain embodiments, both the fall time and the switching energy have been dramatically reduced, e.g., by a factor of 10 to 100 or greater, depending on the thickness of the disk. In certain embodiments, the disk can be in intimate contact (e.g., bonded) with a thermal conductor to further reduce the fall time, at the expense of the switching energy.

In certain embodiments, both the switching energy and the fall time are reduced by using a smaller diameter microsphere as the microresonator. The fall time is roughly proportional to volume of the microsphere, as described in V. S. Il'chenko and M. L. Gorodetskii, previously cited. Similarly, the switching energy is roughly proportional to volume of the microsphere. For example, using a microsphere with a diameter of 50 micrometers instad of 150 micrometers, the fall time drops roughly from about 30 milliseconds to about 3.3 milliseconds, and the switching energy drops from about 85 nanojoules to less than about 10 nanojoules.

Free-Carrier-Induced Switching Mechanism

In certain embodiments, a method of optical switching comprises providing an optical switch comprising an optical coupler and a microresonator optically coupled to the optical coupler and having a plurality of nanoparticles. The method further comprises receiving an optical pulse by the optical switch, wherein at least a portion of the optical pulse is absorbed by the nanoparticles of the microresonator such that at least a portion of the optical switch undergoes an increase of the number of free carriers therein and a corresponding refractive index change when the optical pulse has an optical power greater than a predetermined threshold level.

As described above, in certain embodiments, the microresonator has an optical resonance which shifts in frequency or wavelength with regard to an optical signal due to a thermally-induced refractive index change. In certain other embodiments, the refractive index of the microresonator is modified by the generation of free carriers in the nanoparticles. An empirical relationship, described by R. Soref and B. R. Bennet, "*Electrooptical Effects in Silicon*," IEEE J. Quantum Electron., QE-23, pp. 123-129 (1987), quantifies observed changes in the refractive index ($\Delta n$) and the attenuation coefficient ($\Delta \alpha$) due to free carriers in bulk Si near 1.5 microns.

$$\Delta n = -(8.8 \times 10^{-22} n + 8.5 \times 10^{-18} p^{0.8}) \quad (4)$$

$$\Delta \alpha = 8.5 \times 10^{-18} n + 6.0 \times 10^{-18} p \quad (5)$$

Relatively moderate free carrier concentrations can significantly shift the resonance. Thus, in certain embodiments, optical switching can be obtained by the free-carrier-induced absorption, for which silicon and other semiconductor nanoparticles are well suited.

As an example embodiment with a Si-nanoparticle-doped microsphere, the Si nanoparticles have typical absorption cross sections at the pump wavelength $\lambda$, of 488 nanometers (corresponding to a frequency $\upsilon = 6.1 \times 10^{14}$ Hz) of $\sigma_A = 10^{-16}$ cm$^2$ ($10^{-20}$ m$^2$). Typical nanocrystal densities that can be obtained are about $N_{Si} = 10^{19}$ cm$^{-3}$ ($10^{25}$ m$^{-3}$) and the fluorescence lifetime is about $\tau = 10$ microseconds. (See, e.g., F. Priolo et al., Mat. Sci. Eng. B, Vol. 81, p. 9 (2001).) The absorption depth is thus expected to be small (e.g., $d_{1/e} = N_{Si} \sigma_A = 10$ microns) and no resonant enhancement of the pump is expected.

Using a simple quasi-two-level rate equation model, the number of excited electron-hole pairs, $N_{Ex}$, follows from:

$$\frac{dN_{Ex}}{dt} = N_0 R - \frac{N_{Ex}}{\tau} \quad (5)$$

Where $N_0$ ($N_{Si} - N_{Ex}$) is the number of Si nanoparticles in the ground state and R is the pump up rate for the nanoparticles. This rate can be calculated from:

$$R = \phi \sigma_A = \frac{P \sigma_A}{A_{Mod} h \upsilon} \quad (6)$$

Where $\phi$ is the photon flux, which equals the used power, P=3.4 μW, divided by the mode area, $A_{Mod}$ (about a $\lambda^2 \approx 0.5$ μm$^2 = 0.25 \times 10^{-12}$ m$^2$), and the photon energy, $h\upsilon$.

Solving for the excited concentration of electron-hole pairs gives:

$$N_{Ex} = N_{Si}\frac{\tau R}{\tau R + 1} = \tag{7}$$

$$N_{Si}\frac{\tau\phi\sigma_A}{\tau\phi\sigma_A + 1} = N_{Si}\frac{\tau\sigma_A P/A_{Mod}h\upsilon}{\tau\sigma_A P/A_{Mod}h\upsilon + 1} = 0.97\times 10^{18}\text{cm}^{-3}$$

Where n and p are the electron and hole concentration in units of $cm^{-3}$. For the carrier concentrations mentioned above:

$$\Delta n = -(8.8\times 10^{-22}\times[0.97\times 10^{18}] + 8.5\times 10^{-18}\times[0.97\times 10^{18}]^{0.8}) = 8.5\times 10^{-4} \tag{8}$$

$$\Delta\alpha = 8.5\times 10^{-18}\times[0.97\times 10^{18}] + 6.0\times 10^{-18}\times[0.97\times 10^{18}] = 66\text{ cm}^{-1} \tag{9}$$

In certain embodiments, the refractive index change $\Delta n$ is two orders of magnitude larger than the index change from thermal effects. The attenuation coefficient change $\Delta\alpha$ can be converted into a Q value using:

$$Q = \frac{\pi n_{SiO_2}}{\lambda_s \Delta\alpha} \approx \frac{\pi\times 1.5}{1.5\times 10^{-4}\times 66} = 476. \tag{10}$$

This result implies that the presence of the free carriers would reduce the Q from $3\times 10^5$ to 476 and also be capable of switching the signal.

Different semiconductor nanoparticles will have different cross sections for absorption and different excited carrier lifetimes. For example, direct bandgap semiconductor nanoparticles can be used to make faster switches. In certain embodiments, both the thermal mechanism and the free-carrier mechanism contribute to the refractive index change resulting from the interaction of the pump pulse with the nanoparticles of the microresonator.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of optical switching, the method comprising:
   providing an optical switch comprising an optical coupler and a microresonator optically coupled to the optical coupler and having a plurality of nanoparticles;
   receiving an optical pulse by the optical switch, wherein at least a portion of the optical pulse is transmitted through the optical coupler and is absorbed by the nanoparticles of the microresonator such that at least a portion of the microresonator undergoes an elevation of temperature and a corresponding refractive index change when the optical pulse has an optical power greater than a predetermined threshold level;
   receiving an optical signal by the optical switch; and
   propagating the optical signal through the optical coupler.

2. The method of claim 1, wherein the optical signal is transmitted through the optical switch when the optical power of the optical pulse is greater than the predetermined threshold level and the optical signal is not transmitted through the optical switch when the optical power of the optical pulse is less than the predetermined threshold level.

3. The method of claim 1, wherein the optical signal is not transmitted through the optical switch when the optical power of the optical pulse is greater than the predetermined threshold level and the optical signal is transmitted through the optical switch when the optical power of the optical pulse is less than the predetermined threshold level.

4. The method of claim 1, wherein the optical pulse has a duration such that heat generated by the optical pulse within a mode volume of the microresonator does not flow out of the mode volume during the duration of the optical pulse.

5. The method of claim 1, wherein the optical pulse has a duration such that heat generated by the optical pulse within a mode volume of the microresonator flows out of the mode volume during the duration of the optical pulse.

6. The method of claim 1, wherein the plurality of nanoparticles comprises silicon nanocrystals within a silica layer of the microresonator.

7. The method of claim 6, wherein the plurality of nanoparticles are passivated by hydrogen.

8. The method of claim 6, wherein the silica layer comprises silicon-rich silicon oxide.

9. The method of claim 1, wherein the optical coupler comprises an optical fiber having a tapered portion optically coupled to the microresonator.

10. An optical switch comprising:
    a microresonator comprising a silicon-rich silicon oxide layer and a plurality of silicon nanoparticles within the silicon-rich silicon oxide layer, the microresonator configured to receive signal light having a signal wavelength and to receive a pump pulse having a pump wavelength, wherein at least a portion of the microresonator is responsive to the pump pulse by undergoing a refractive index change at the signal wavelength; and
    an optical coupler optically coupled to the microresonator and configured to be optically coupled to a pump source and to a signal source, wherein the optical coupler transmits the pump pulse from the pump source to the microresonator and transmits the signal light from the signal source to the microresonator.

11. The optical switch of claim 10, wherein the plurality of silicon nanoparticles comprises silicon nanocrystals.

12. The optical switch of claim 11, wherein the silicon nanocrystals are hydrogen-passivated.

13. The optical switch of claim 10, wherein the optical coupler comprises an optical fiber having a tapered portion optically coupled to the microresonator.

14. The optical switch of claim 10, wherein the microresonator comprises a coating comprising the silicon-rich silicon oxide layer.

15. The method of claim 1, wherein said propagating the optical signal through the optical coupler comprises transmitting the optical signal to the microresonator.

16. The method of claim 1, wherein said propagating the optical signal through the optical coupler comprises transmitting the optical signal from the microresonator.

* * * * *

UNITED STATES PATENT AND TRADEMARK OFFICE
CERTIFICATE OF CORRECTION

PATENT NO. : 8,520,988 B2  Page 1 of 1
APPLICATION NO. : 13/453588
DATED : August 27, 2013
INVENTOR(S) : Digonnet et al.

It is certified that error appears in the above-identified patent and that said Letters Patent is hereby corrected as shown below:

On the Title page, References Cited, Item (56), under Other Publications, page 2, column 1, line 66, replace "prepared using" with --using--.

In the Specification

In column 4, line 67, replace "toxoid" with -- toroid --.

In column 18, line 27, replace "1n(2)" with -- ln(2) --.

In column 18, line 30, replace "$1-\exp(-1n(2) \times 3^2)=0.998$" with -- $1-\exp(-\ln(2) \times 3^2)=0.998$ --.

Signed and Sealed this
Twenty-fourth Day of June, 2014

Michelle K. Lee
*Deputy Director of the United States Patent and Trademark Office*